US005682421A

United States Patent [19]
Glovitz et al.

[11] Patent Number: 5,682,421
[45] Date of Patent: Oct. 28, 1997

[54] METHODS FOR IMPLEMENTING AUTOMATED DISPATCH SYSTEM

[75] Inventors: Robert J. Glovitz, Scottsdale; Daniel J. Johnson, Phoenix; Christopher W. Ames, Gilbert, all of Ariz.

[73] Assignee: A.D.S. Communications, Inc., Phoenix, Ariz.

[21] Appl. No.: 573,510

[22] Filed: Dec. 15, 1995

Related U.S. Application Data

[63] Continuation of Ser. No. 407,392, Mar. 20, 1995, abandoned, which is a continuation of Ser. No. 101,953, Aug. 3, 1993, abandoned.

[51] Int. Cl.$^6$ ................................................. H04M 11/00
[52] U.S. Cl. ........................... 379/97; 379/100; 379/88; 358/305
[58] Field of Search ........................... 379/90, 93, 96–98, 379/100, 110, 67, 88, 89; 358/400, 305; 335/203–209, 308

[56] References Cited

U.S. PATENT DOCUMENTS

| | | | |
|---|---|---|---|
| 4,427,848 | 1/1984 | Tsakanikas | 379/97 |
| 4,649,563 | 3/1987 | Riskin | 379/88 |
| 4,650,927 | 3/1987 | James | 379/88 |
| 4,659,877 | 4/1987 | Dorsey et al. | 379/96 |
| 4,837,811 | 6/1989 | Butler et al. | 379/97 |
| 4,922,514 | 5/1990 | Bergeron et al. | 379/88 |
| 5,236,199 | 8/1993 | Thompson, Jr. | 379/90 |
| 5,273,288 | 12/1993 | Teshima et al. | 379/96 |
| 5,394,458 | 2/1995 | Allen et al. | 379/100 |

*Primary Examiner*—Wing F. Chan
*Attorney, Agent, or Firm*—Snell & Wilmer LLP

[57] ABSTRACT

An automated dispatch system permits field technicians to interface with a central computer via conventional telephone systems that utilize DTMF protocols. The dispatch system cooperates with a remote data entry unit including a DTMF telephone keypad and an alphanumeric keyboard, and a host computer selectively communicates with the data entry unit and with the dispatch system. The dispatch system implements a voice response unit for storing voice messages and transmitting voice messages to and from field technicians supported by the dispatch system. In connection with service calls, field technicians input service data into the host computer via the data entry unit. The dispatch system is configured such that digit pairs entered from the telephone keypad correspond to letters in the alphabet and various symbols. In this manner, the field technicians can indicate part numbers or other data containing non-numeric information.

11 Claims, 12 Drawing Sheets

| | |
|---|---|
| Open call buffer | 202 |
| Open parts buffer | 204 |
| Configuration buffer | 206 |
| Employee buffer | 208 |
| Group message master buffer | 210 |
| Group message detail buffer | 212 |
| Closed call buffer | 214 |
| Closed parts buffer | 216 |
| Call history buffer | 218 |
| Parts history buffer | 220 |
| Message queue | 222 |
| Last call file | 224 |
| Voice message file | 226 |
| SCO UNIX | 232 |
| VRU | 234 |
| IPC MGR | 236 |
| Close D | 238 |
| Host interface | 240 |
| Offline interface | 241 |
| Online interface | 243 |
| Technician's mailboxes (C-ISAM Index) | 252 |
| Dispatcher customer mailbox (C-ISAM Index) | 254 |
| Operator's mailbox (C-ISAM Index) | 256 |
| Caller identity buffer | 258 |
| C-ISAM | 260 |
| Per Diem buffer | 262 |

FIG. 2A

| (3) CALL KEY | (10) EXTENSION NUMBER | (31) MESSAGE FILE NAME | (63) EXT/TYPE CALL/ CALL STATUS/ MESSAGE ORDER |
|---|---|---|---|
| 0001 | 000010 | 00000001.0 | 000010/SC/OC/0001 |
| 0002 | 000020 | 00000002.0 | 000020/VM/ /0001 |
| 0003 | 000010 | 00000003.0 | 000010/VM/ /0001 |
| 0004 | 000010 | 00000004.0 | 000010/SC/OC/0002 |
| 0005 | 000010 | 00000005.0 | 000010/VM/ /0002 |
| . | . | . | . |
| . | . | . | . |
| . | . | . | . |
| . | . | . | . |
| . | . | . | . |

FIG. 2B

| | FROM | TO | |
|---|---|---|---|
| MQ-OPEN-CALL | VRU 234 | INT 240 | 222(a) |
| MQ-CALL-DISP | VRU 234 | INT 240 | 222(b) |
| MQ-BEGIN-CLOSE | VRU 234 | CLOSED 238 | 222(c) |
| MQ-NOTIFY-OMD | CLOSED 238 | INT 240 | 222(d) |
| MQ-FINISH-CLOSE | INT 240 | CLOSED 238 | 222(e) |
| MQ-RECEIVE-CHAR | INT 240 | INT 240 | 222(f) |
| MQ-NULL | | | 222(g) |
| | | | |

| | | |
|---|---|---|
| VOX | (voice file) | 604 |
| DATA | (ADFS data files) | 606 |
| TMP | (working space) | 608 |
| BPLATE | (fax image) | 610 |
| DIR | (directory entry names) | 612 |
| FAX PENDING | (assemble outbound faxes) | 614 |
| HISTORY | (last call voice history) | 616 |
| INTRO | (voice message intro) | 618 |
| MESS | (messages) | 620 |
| ORDER | (voice message of supply orders) | 622 |
| PDS | (applications developments) | 624 |
| PRODUCTS | (fax on demand image files) | 626 |
| SUPPLIES | (fax on demand for supplies, etc.) | 628 |
| SCHEMATICS | (schematics for equipment) | 630 |

NON-NUMERIC CHARACTER TO DIGIT PAIR TABLE

| ALPHA CHARACTER | DIGIT CODE | OFFSET | ALPHA CHARACTER | DIGIT CODE | OFFSET | ALPHA CHARACTER | DIGIT CODE | OFFSET |
|---|---|---|---|---|---|---|---|---|
| A | 01 | +64 | ] | 29 | +64 | { | 57 | +66 |
| B | 02 | +64 | ^ | 30 | +64 | \| | 58 | +66 |
| C | 03 | +64 | a | 31 | +66 | } | 59 | +66 |
| D | 04 | +64 | b | 32 | +66 | ~ | 60 | +66 |
| E | 05 | +64 | c | 33 | +66 | ! | 61 | −28 |
| F | 06 | +64 | d | 34 | +66 | " | 62 | −28 |
| G | 07 | +64 | e | 35 | +66 | # | 63 | −28 |
| H | 08 | +64 | f | 36 | +66 | $ | 64 | −28 |
| I | 09 | +64 | g | 37 | +66 | % | 65 | −28 |
| J | 10 | +64 | h | 38 | +66 | & | 66 | −28 |
| K | 11 | +64 | i | 39 | +66 | ' | 67 | −28 |
| L | 12 | +64 | j | 40 | +66 | ( | 68 | −28 |
| M | 13 | +64 | k | 41 | +66 | ) | 69 | −28 |
| N | 14 | +64 | l | 42 | +66 | * | 70 | −28 |
| O | 15 | +64 | m | 43 | +66 | + | 71 | −28 |
| P | 16 | +64 | n | 44 | +66 | , | 72 | −28 |
| Q | 17 | +64 | o | 45 | +66 | − | 73 | −28 |
| R | 18 | +64 | p | 46 | +66 | . | 74 | −28 |
| S | 19 | +64 | q | 47 | +66 | / | 75 | −28 |
| T | 20 | +64 | r | 48 | +66 | : | 76 | −18 |
| U | 21 | +64 | s | 49 | +66 | ; | 77 | −18 |
| V | 22 | +64 | t | 50 | +66 | < | 78 | −18 |
| W | 23 | +64 | u | 51 | +66 | = | 79 | −18 |
| X | 24 | +64 | v | 52 | +66 | > | 80 | −18 |
| Y | 25 | +64 | w | 53 | +66 | ? | 81 | −18 |
| Z | 26 | +64 | x | 54 | +66 | @ | 82 | −18 |
| [ | 27 | +64 | y | 55 | +66 | _ | 83 | −12 |
| \ | 28 | +64 | z | 56 | +66 | ` | 84 | −12 |

FIG. 7

Conversion Formula
Digit Pair to Decimal Value of Non-numeric Character 01-30, add 64
31-60, add 66
61-75, subtract 28
76-82, subtract 18
83-84, add 12

METHODS FOR IMPLEMENTING AUTOMATED DISPATCH SYSTEM

RELATED APPLICATIONS

This application is a continuation of Ser. No. 08/407,392, filed Mar. 20, 1995 (abandoned), which is a continuation of Ser. No. 08/101,953, filed Aug. 3, 1993 (abandoned).

TECHNICAL FIELD

The present invention relates, generally, to methods and apparatus for implementing an automated dispatch service system and, more particularly, to a system which permits field technicians to interface with a central computer via conventional telephone systems.

BACKGROUND ART AND TECHNICAL PROBLEMS

Modern machinery enhances communication, efficiency, and the quality of every day life. Refrigerators, televisions, telephones, photocopiers, and personal computers, to name just a few items, have all made our lives easier, more efficient, and healthier than the lives of those just a few generations ago. These technological solutions, however, are so common that many people rely upon these machines to perform, and commonly take them for granted. When these machines fail, businesses falter and daily routines are interrupted until the equipment is repaired.

Maintenance of these machines supports an industry aspiring to keep these machines operating, and which quickly and efficiently repairs them when they fail. Many machines, e.g., photocopiers, however, cannot be easily transported to a repair shop. Instead, photocopier maintenance is commonly performed on-site where the equipment is installed. When the photocopier requires maintenance, the customer contacts the service company (the "dealer" herein), which dispatches a maintenance technician to the site to resolve the problem. On-site technicians permit equipment to be effectively maintained without unduly depriving the business of its use.

The most effective photocopier service companies are those that can immediately dispatch a qualified technician to the customer's site to resolve the problem. To maximize efficiency, many dealers employ complex and highly efficient computer-assisted dispatching systems for sorting service requests according to their nature and location and dispatching a qualified technician with minimal delay. For example, in the OMD Service Dispatch/Management System, technicians are assigned to particular service requests based on priority, type of call, type of equipment, and the technician's qualifications and geographical location. When a service request is completed, the actual time spent by the technician and the parts inventory used to repair the equipment are stored and later used to compute a customer invoice. Data collected for inventory usage and service of specific copiers may be used to evaluate equipment reliability and profitability. The data may also be used to evaluate a technician's performance. This system may be integrated with a wide range of other systems to manage accounting and inventory.

Computer-assisted dispatch systems like the OMD system require a human dispatcher to enter service request data and control various aspects of the system. Generally, when a photocopier fails, the customer calls the service company and talks to the dispatcher. The dispatcher establishes various facts, particularly the nature of the request for establishing priority and the photocopier's equipment identification number. Each copier serviced by a particular dealer has an arbitrary equipment identification number assigned to it by the dealer which is separate from the model number and serial number. The model number and serial number normally include a total of 14 or more digits to uniquely identify the copier among all of the copiers that have ever been manufactured. For service request purposes, identifying copiers by their model numbers and serial numbers is awkward due to the number of digits and inaccessibility of the information; hence each dealer commonly assigns a smaller arbitrary number, for example a 5-digit alphanumeric character string, to each copier it services.

The dispatcher enters the equipment identification number and other pertinent information into the OMD computer system in response to a request for service from a customer. The dispatcher opens a computer file, known in the industry as an open call record, which includes multiple fields of data regarding the particular customer and photocopier. Most of the fields of data have been previously entered when service was initiated and during interim maintenance visits. The new service request data is entered into the open call record, and the open call record is assigned an OPEN status. All of this information from the dispatcher is entered and retrieved through a conventional keyboard.

When a technician calls in to receive his next assignment, the dispatcher uses the computer system to determine which open call records exist in the technician's current geographical area and for which the technician is qualified. Alternatively, the dispatcher can assign the open call record to a particular technician so that a customer's request for a specific technician may be honored. The dispatcher determines which open call record is to be serviced next by the technician, and provides the location and nature of the service request to the technician over the telephone. If the service technician requires further information, the dispatcher may access a wide range of information from the computer system and orally convey it to the technician. When the technician receives his new assignment, the status of the open call record is updated to DISPATCHED, so that a second technician is not assigned to the same service request.

In addition to receiving information regarding his next assignment, the technician may also provide the dispatcher with data regarding his most recently completed service call. The technician may convey to the dispatcher the nature of the problem, any steps taken to fix it, and the parts that were used to fix the machine. This information is entered into the computer and added to the record for the particular copier to maintain a complete service history of the copier. When the data is complete, the record is designated as CLOSED, and the data is stored until the next service request is received for that photocopier.

Although these computer-assisted systems are fairly reliable and effective, they suffer several shortcomings. When the technician calls to close his current call and receive his next assignment, customer service requests normally take priority over technicians' calls for new assignments. During peak times, the dispatcher may be overloaded with customers' calls. While the customer is on the line, the technician is placed on hold until the dispatcher has completed her assistance to the customer. Only then does the technician receive the information for his next assignment. All too frequently, the technician may remain on hold for ten minutes or longer. During the normal business day, a technician may spend a total of up to an hour on hold waiting for the dispatcher to receive his call and give him his next assignment.

Not only does the delay waste the technician's valuable time, but the technician normally uses the customer's telephone to call the dispatcher. When the technician remains on hold for extended periods, the technician occupies a phone line that may be more profitably used by the customer. Tying up one of the office phone lines degrades customer relations, costing both the service company and the customer valuable time and resources.

Further, the time spent providing information to the technician regarding his next service call consumes the dispatcher's time as well. Calls from customers or calls for re-assignment from other technicians may be delayed, exacerbating the backlog problem. Consequently, the time that the equipment remains inoperable is extended, further consuming money, time, and goodwill.

Although these problems may be diminished by adding dispatchers, adding staff costs money, and much of the staff may be idle at other than peak times. To streamline the service request and dispatch system, various stages of the process have been automated. For example, one system employs dedicated remotely operated handheld communication units. These dedicated wireless units communicate with a central computer dispatch system similar to the OMD computer described above. These units are two-way communication systems that allow the technician to interface with the computer system and retrieve his next assigned service request. Although this system may theoretically be effective, the technical problems encountered in effectively transmitting and receiving data, in addition to the high costs of such systems, severely limit their practicality. Aside from the daunting technical problems and costs, each technician is required to carry an expensive and easily lost or damaged handheld unit. The apprehension of its loss is significant for both the technician and the company, and the cost of insuring the unit is substantial.

Alternatively, a system may be implemented utilizing two-way modem communication over a telephone line using a small computer and an acoustic coupler. The handset of the telephone is connected to the computer, or the computer system can be connected to a telephone wall jack. Communications between the computer system and the technician may then be implemented, using the computer connected to the telephone line as an interface with the main dispatch computer. A number of problems are associated with acoustic coupling, however, that disrupt the integrity of data transmission. In addition, telephones employ a wide array of telephone jacks that are not interchangeable. If a particular customer site does not have a compatible telephone jack, the technician must call the dispatcher conventionally or search out a compatible telephone jack at another location. Further, although the phone handset could conceivably be disassembled to bypass the jack, most companies would be shocked to find a copier technician disassembling a part of their expensive phone system to merely contact his office.

An automated dispatch system is thus needed which overcomes the shortcomings of the prior art.

SUMMARY OF THE INVENTION

The automated dispatch system of the present invention provides a relatively inexpensive system and method of providing remote access to the central dispatch computer by technicians in the field. According to one aspect of the present invention, the system uses dual-tone multifrequency (DTMF) signals to transmit information from the technician to the computer system. Dual-tone multifrequency (DTMF) presents a communications system in which pairs of tones at different frequencies are transmitted simultaneously to indicate particular values. In a common touch-tone telephone system, different frequencies are associated with each of the horizontal rows of buttons, and another set of frequencies are associated with the vertical columns. When an individual button is pressed, the telephone set generates two tones simultaneously, one tone at the frequency associated with the row of the button and the other tone at the frequency associated with the column. Each button on the keypad thus generates a unique combination of two tones, which can be decoded by the telephone circuitry to determine which keys have been depressed. Using this system, the technician can communicate alpha-numeric information to the central computer database.

For example, according to another aspect of the present invention, an alpha-numeric-to-DTMF conversion system may comprise a pair of keystrokes corresponding to each letter in the alphabet, both upper and lower case, and other pairs of keystrokes corresponding to various symbols. By transmitting a series of two-keystroke combinations to the computer system through the telephone keypad, the technician can indicate a part number or other data even though that part number contains non-numeric data.

According to another aspect of the present invention, an extension, analagous to a voice mail extension, is assigned to each technician. When service requests are received and assigned to a particular technician, a call number identifying the service request is stored at a location corresponding to the technician's extension. The call number allows the technician to selectively retrieve data from the computer system relating to the service request, such as the make and model of the photocopier, the address for the service request, the maintenance history of the photocopier, and the like.

According to one aspect of the present invention, this information is stored digitally by the computer system, and is translated into verbal voice messages by a voice response unit.

In accordance with a preferred embodiment, this system uses a telephone keypad and a voice response unit to provide the interface between the technician and the computer; hence, no further equipment is required. Handheld wireless units are obviated by using conventional telephone connections. Computer units connected to the telephone are also unnecessary, because communications are conveyed in a form readily understood by the host computer. Moreover, the integrity of transmitted information is preserved using established DTMF and voice response technology. Consequently, a reliable method and apparatus for establishing an interface between a field technician and a computer system is provided without necessitating a separate dedicated communications unit.

BRIEF DESCRIPTION OF THE DRAWING FIGURES

The present invention will hereinafter be described in conjunction with the appended drawing figures, wherein like numerals denote like elements, and:

FIG. 2A is an exemplary memory map showing the various files comprising the memory element set forth in FIG. 1;

Figure 1:
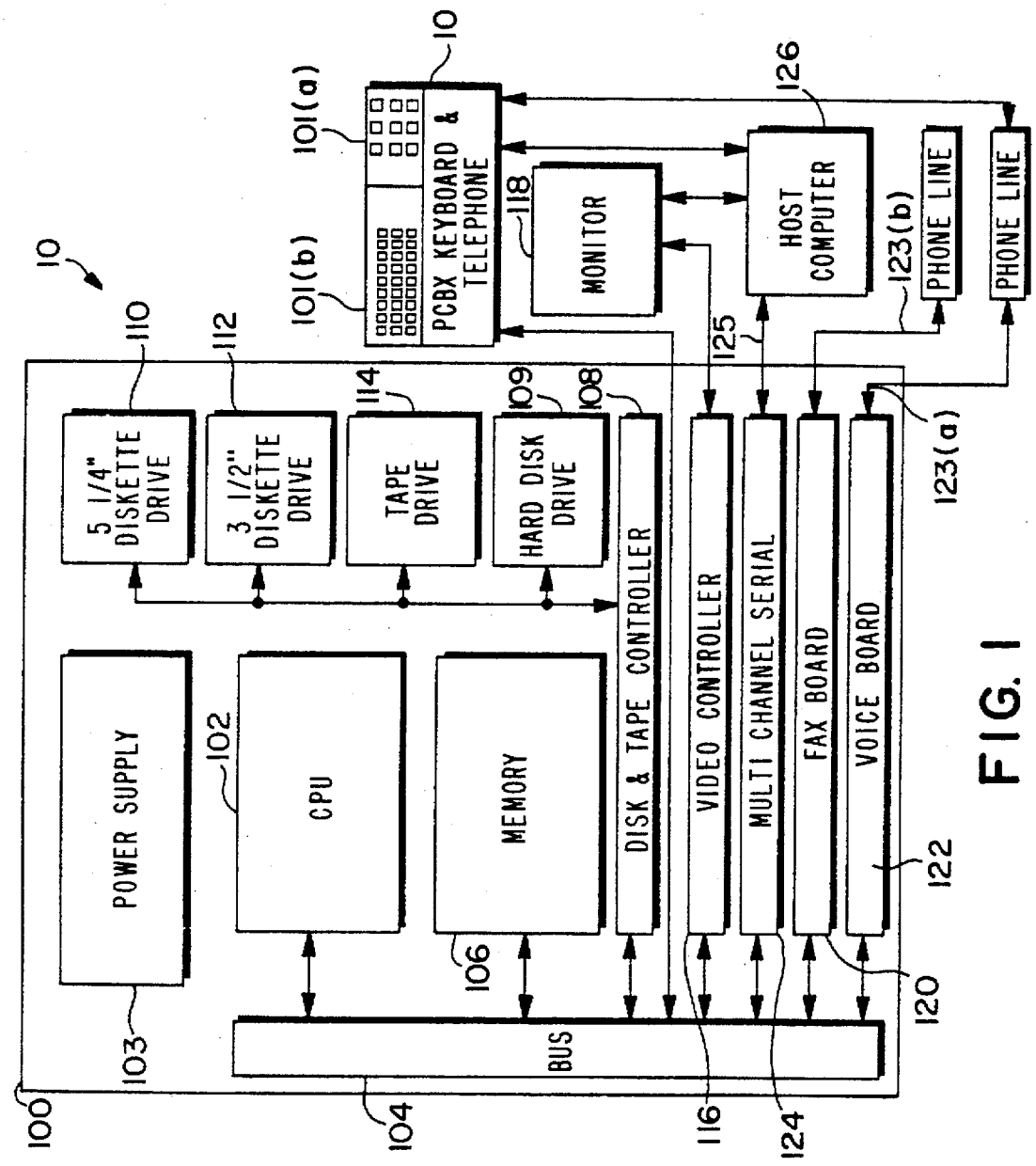
FIG. 1 is a schematic block diagram of an exemplary embodiment of an automated dispatch system in accordance with the present invention, shown connected to a data entry unit, a monitor, and a host computer.
Figure 3A:
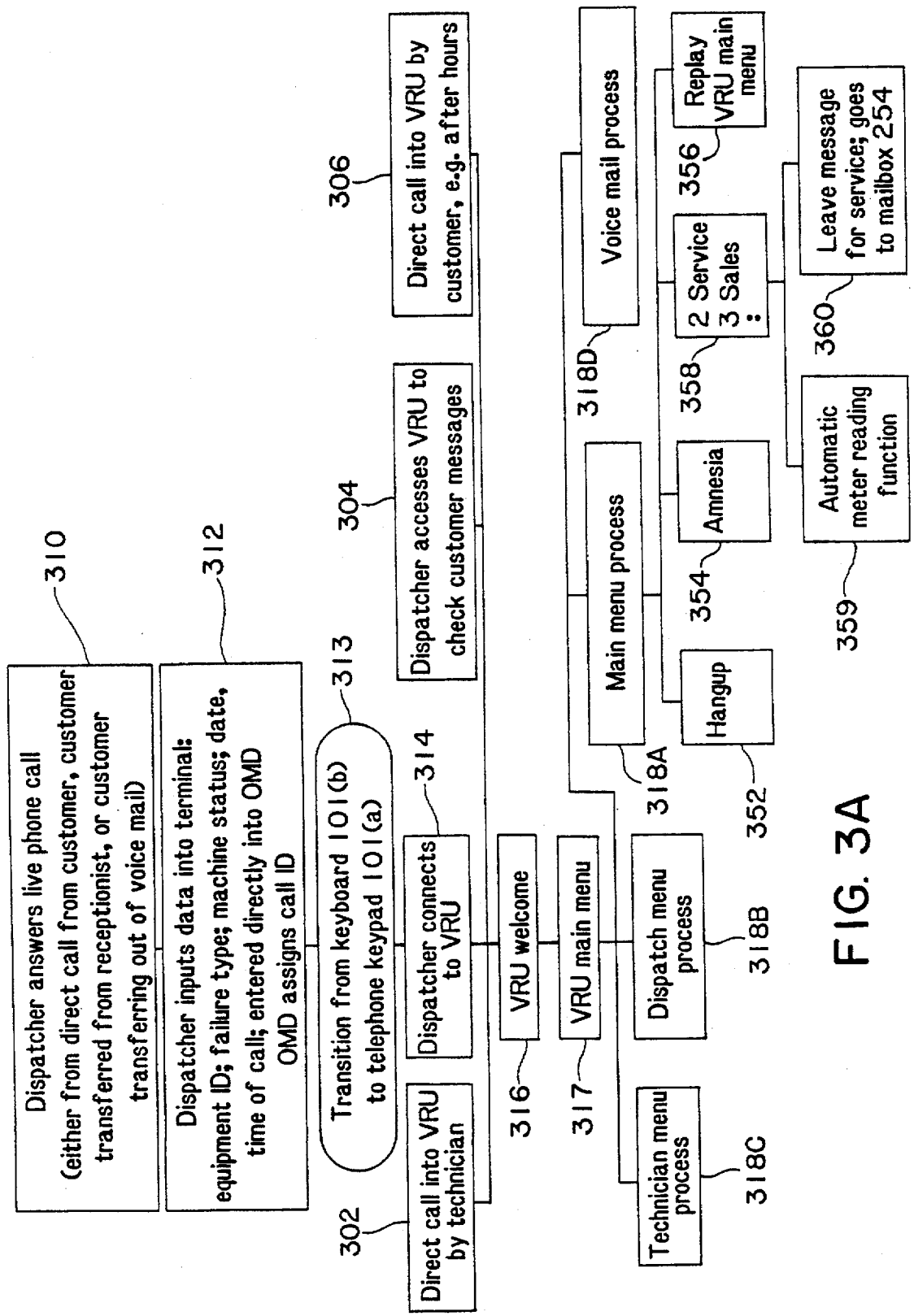
Figure 3B:
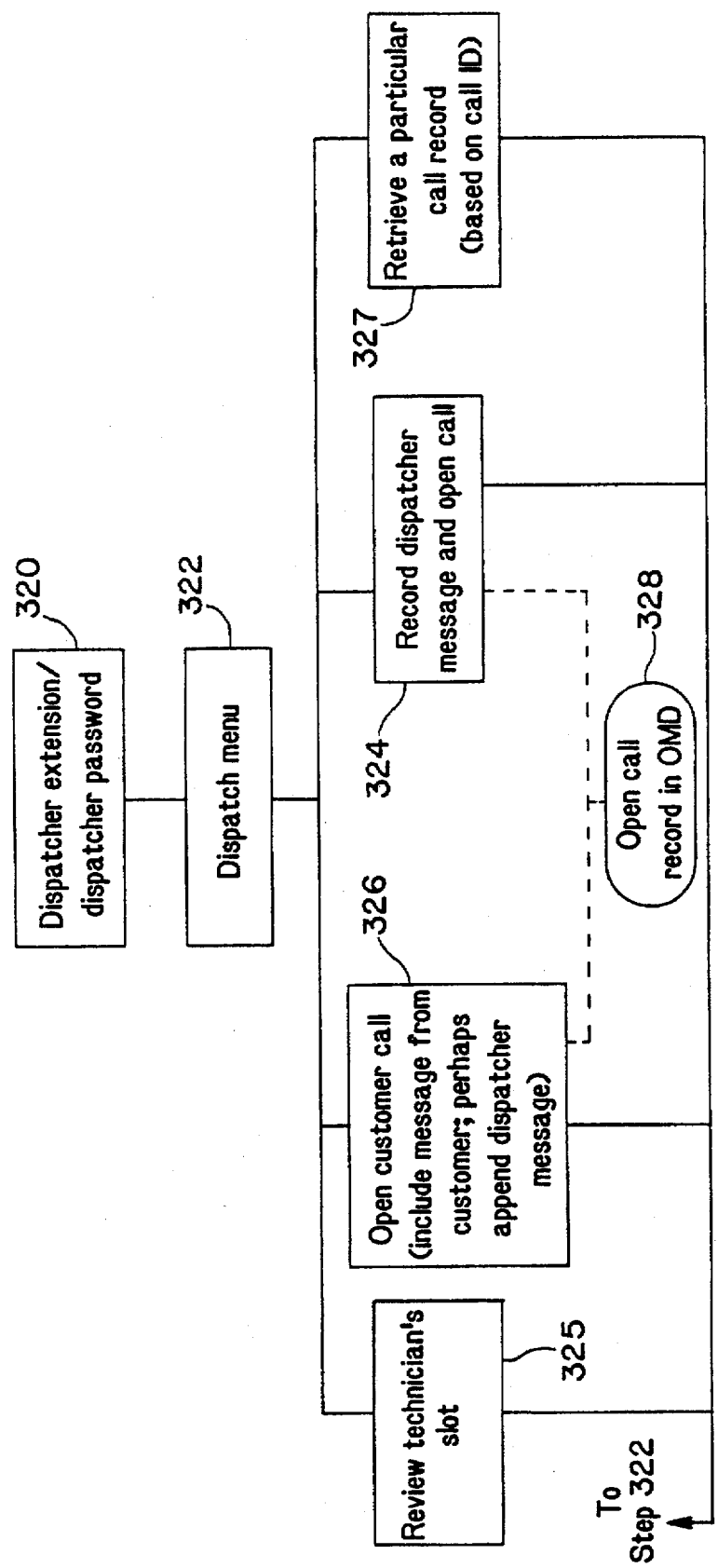
Figures 3C, 4:
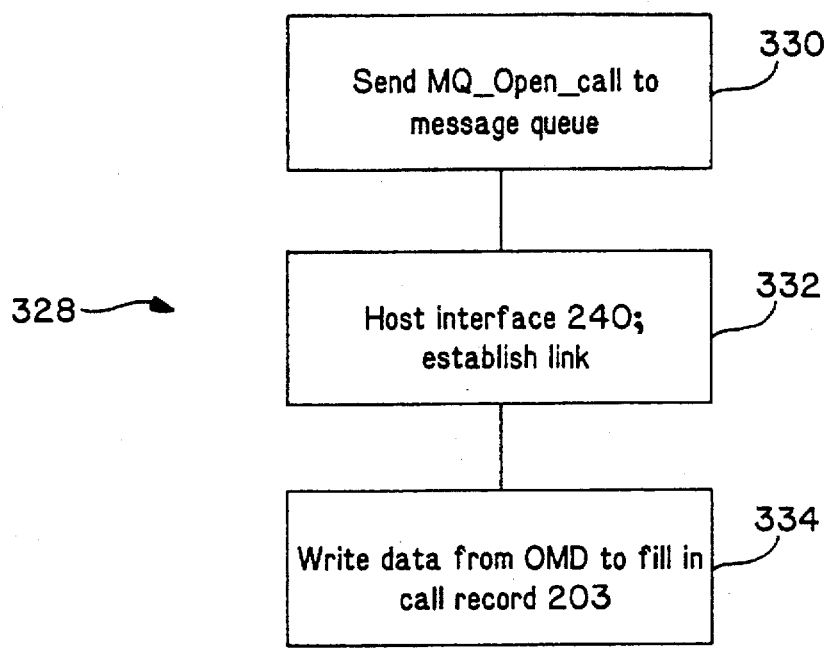
Figure 5:
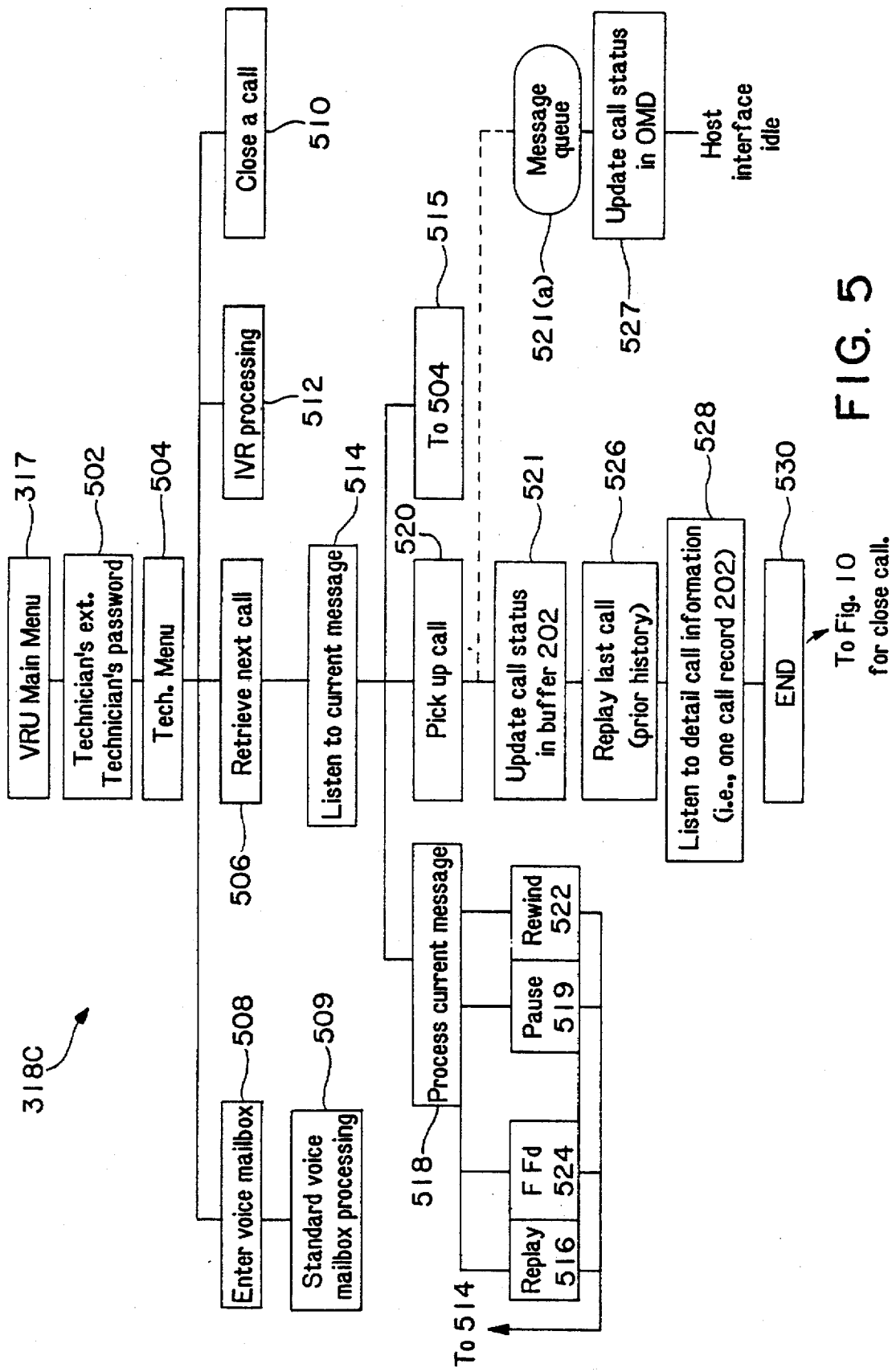
Figures 8, 9:
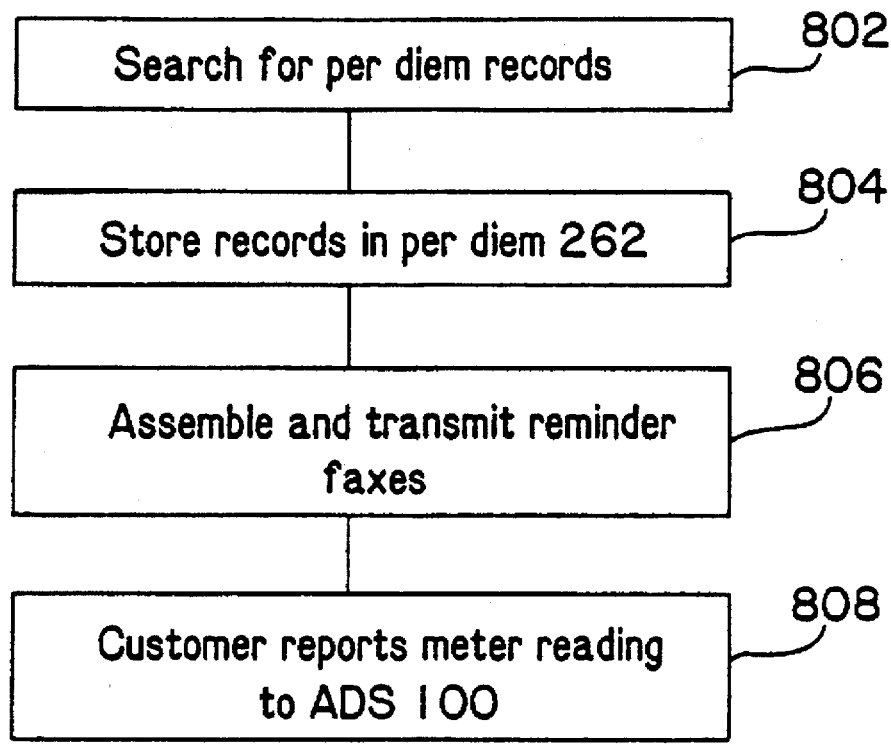
Figure 10A:
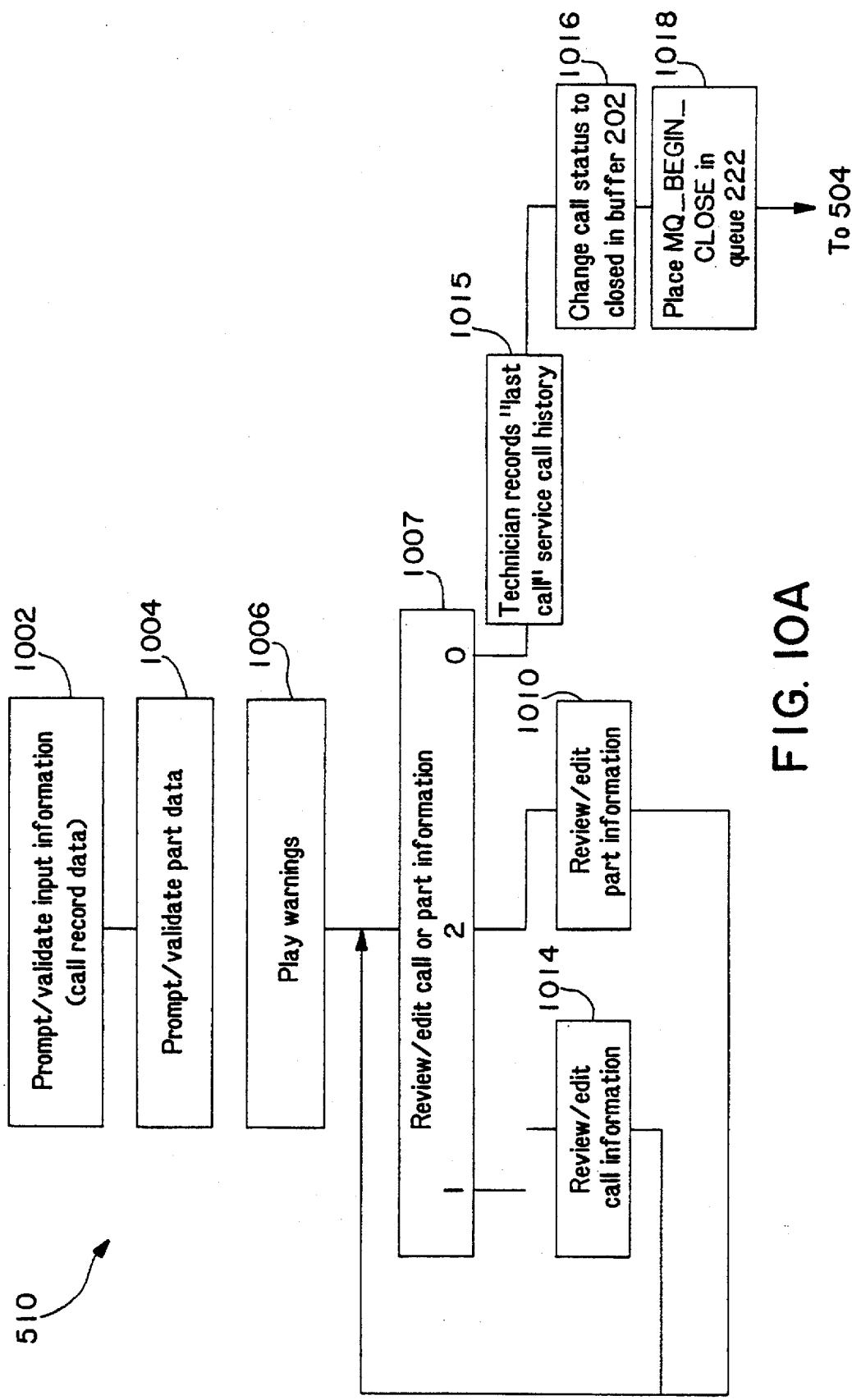
Figure 10B:
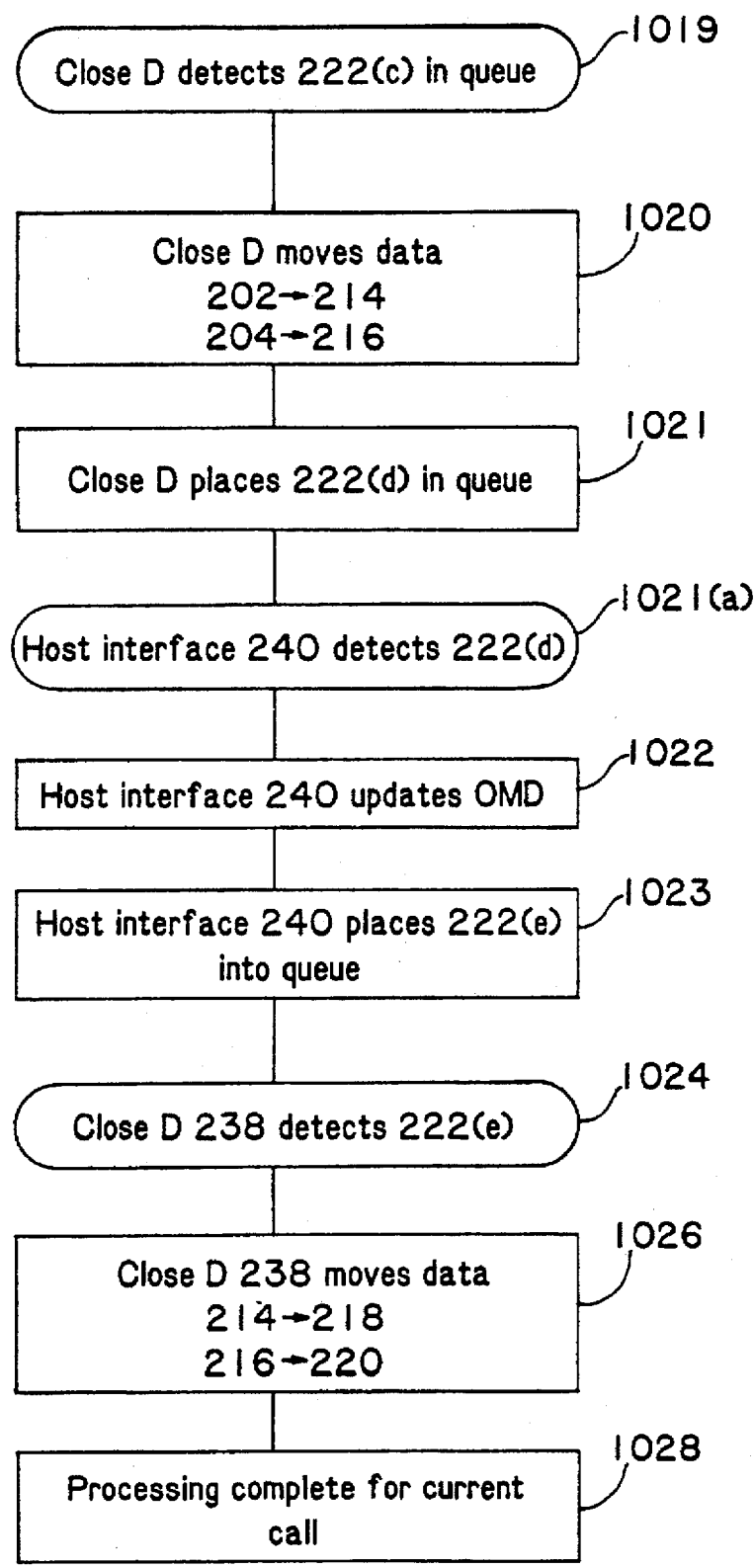

FIG. 2B sets forth an exemplary stack of open call records comprising the open call buffer shown in FIG. 2A;

FIGS. 3A and 3B set forth, in flow chart form, an exemplary embodiment of the process by which a service call is opened in accordance with one aspect of the present invention;

FIG. 3C is a detailed flow chart description of step 328 of FIG. 3B;

FIG. 4 is a message matrix setting forth the various messages used in connection with the shared memory message queue shown in FIG. 2A;

FIG. 5 is a flow chart setting forth an exemplary embodiment of the process by which a service call is dispatched in accordance with one aspect of the present invention;

FIG. 6 is an exemplary memory map setting forth the directories comprising the hard disc drive shown in FIG. 1;

FIG. 7 is an exemplary conversion chart by which non-numeric characters are converted to corresponding digit pairs in accordance with one aspect of the present invention;

FIG. 8 is a flow chart of an exemplary process by which facsimile reminders are assembled and transmitted for per diem records in accordance with one aspect of the present invention;

FIG. 9 sets forth an exemplary conversion formula by which the digit pairs set forth in FIG. 7 may be represented as digits transmitted via a telephone keypad in accordance with one aspect of the present invention; and FIGS. 10A and 10B are flow charts setting forth an exemplary process by which a service call is closed in accordance with one aspect of the present invention.

DETAILED DESCRIPTION OF PREFERRED EXEMPLARY EMBODIMENTS

Referring now to FIG. 1, an exemplary service call management system 10 suitably comprises an automated dispatch system (ADS) 100, a data entry unit (DEU) 101 including a dual-tone, multifrequency (DTMF) telephone keypad 101(a) and an alpha-numeric keyboard 101(b), a host computer 126 configured to selectively communicate with DEU 101 and ADS 100, and a monitor 118 also configured to selectively communicate with ADS 100 and host computer 126. Service call management system 10 further comprises respective telephone lines 123(a) and 123(b) for facilitating remote telephone access to ADS 100 by various technicians, customers and dispatchers.

Automated dispatch system (ADS) 100 suitably comprises a CPU 102, a power supply 103, a data communications bus 104, a memory 106, a disc and tape controller 108, a first disc drive 110, a second disc drive 112, a tape drive 114, a mass storage unit, e.g., a hard disc drive 109, a video controller 116, a facsimile (fax) board 120, a voice board 122, a communications board 124, and an interface link 125. Interface link 125 is suitably configured to selectively establish a data path between ADS 100 and remote host computer 126, as discussed in greater detail below. Host computer 126 suitably comprises an optimizing management decisions (OMD) management information system of the type widely used in the dispatch industry. Host computer 126 is available from the OMD Corporation of Jefferson City, Mo. Typically, host computer 126 is configured to coordinate the various operations carried on by a service dealership, for example an office equipment (e.g., photocopier) service company employing a plurality of technicians routinely dispatched to remote customer sites to repair and/or service office equipment. Typically, the dealership's customer base comprises customers operating under a maintenance agreement (sometimes referred to as a service contract) with the dealer.

The day-to-day functions of the dealership's business are coordinated by the host computer 126, including the technician's dispatch function, inventory control, accounting, sales, and the like. Typical OMD systems such as host computer 126 dynamically maintain a plurality of databases, for example, equipment history, customer history, service history, and the like. Host computer 126 suitably comprises a data file which includes all of the relevant information pertaining to each piece of equipment (which) which is owned and/or serviced by the dealer.

In accordance with one aspect of the present invention, interface link 125 establishes communication between host computer 126 and ADS 100 on least three occasions: the creation of an open call record, during which pertinent information pertaining to a particular piece of equipment is loaded from host computer 126 into a predetermined open call record within memory 106 (discussed in greater detail below); the dispatching of a service call to a technician, at which time ADS 100 updates the data file resident within OMD 126 to indicate that a technician has been dispatched to service the call; and the generation of a closed call message, during which the data file within OMD 126 pertaining to a particular call record is updated to reflect the fact that the technician has completed the service call.

In a preferred embodiment, ADS 100 may comprise a personal computer manufactured by Unisys, for example, a 386, 33 Mhz, Unisys Model WS-33, augmented with additional hardware and software to effect the functionality shown in FIG. 1 and described herein.

More particularly, first disc drive 110 suitably comprises a conventional 5¼" floppy disc drive and second disc drive 112 suitably comprises a conventional 3½" hard disc drive.

Because of the relatively large processing power required to implement the voice data communication functions set forth herein in the illustrated embodiment, CPU 102 suitably comprises a 486 DX microprocessor manufactured by Intel Corporation, operating at a 33 Mhz clock speed.

Disc and tape controller 108 suitably comprises a conventional controller, for example, a AHA1542A, REV.E manufactured by ADAPTEC. Video controller 116 suitably comprises a VGA model number 452 VGA BIOS, manufactured by Chips & Technology. Disc and tape controller 108 and video controller 116 are suitably SCSI compatible; alternatively, EISA technology may also be employed in the context of the present invention.

Fax board 120 suitably comprises a two channel, group three compatible, two line, 9600 baud board, for example a model DigiFax, manufactured by DigiBoard, Inc. Fax board 120 is configured to convert a digitized facsimile image resident within memory 106 into a facsimile compatible signal for a transmission over fax line 123(b) (conventional telephone line) to be received by a conventional fax machine which ultimate converts the image back into a fax image.

Voice board 122 comprises a four-channel voice communication board, for example a model number D41D, manufactured by the Dialogic Corporation. Voice board 122 is suitably operated in its analog mode at the telephone interface. Voice board 122 desirably converts analog voice signals, as well as DTMF signals, received from the telephone line into digital signals compatible with CPU 102 and memory 106 via bus 104. Similarly, voice board 122 is configured to convert digital signals applied thereto from CPU 102 and memory 106 via bus 104 into voice and/or DTMF output signals for application to telephone line 123(a).

Referring now to FIGS. 2A, 2B, and 6, the various sectors comprising memory 106 and hard disc 109 will now be described. In this regard, it should be noted that an exemplary embodiment of ADS 100 suitably utilizes an SCO Unix operating system and an indexed sequential access method (ISAM) file architecture. Thus, although the various directories, files, buffers, and the like comprising memory 106 and hard drive (mass storage) 109 are variously set forth in FIGS. 2A, 2B and 6, it will be appreciated that certain files will dynamically increase and decrease in size during the operation of ADS 100, and certain data sectors will be periodically written from memory 106 onto hard disc 109, as determined by the ISAM file management scheme and the SCO Unix operating system.

With initial reference to FIG. 2A, memory 106 suitably comprises an open call buffer 202, an open parts buffer 204, a configuration buffer 206, an employee buffer 208, a group message master buffer 210, a group message detail buffer 212, a closed call buffer 214, a closed parts buffer 216, a call history buffer 218, a parts history buffer 220, a message queue 222, a LAST CALL™ file 224, a voice message file 226, an SCO Unix program 232, a VRU program 234, an IPC MGR program 236, a Close D program 238, a host interface program 240, an off-line interface program 241, an on-line interface program 243, a technician's mailbox file 252, and dispatcher customer mailbox file 254, an operator's mailbox file 256, a caller identity buffer 258, and a ISAM (indexed sequential access method) program 260. The foregoing files, buffers, programs, and queue are discussed in greater detail below in conjunction with the various aspects of the present invention to which they relate.

More particularly, open call buffer comprises a plurality of open call records 203 (discussed in greater detail below in conjunction with FIG. 2B). Open parts buffer 204 comprises a separate, corresponding parts record (not shown), for each call record within open call buffer 202. Each call record 203 (and corresponding parts record) not show) is maintained in memory 106 for each service call, and contains a plurality of fields which are selectively updated during the processing of the service call.

Open parts buffer 204 is implemented in a manner analogous to open call buffer 202 (discussed below in conjunction with, inter alia, FIG. 2B); each open parts record (not shown) within open parts buffer 204 comprises a plurality of fields corresponding to selected information pertaining to a part used in connection with the service call, for example the part number, quantity of part used during the service call, and the like.

Configuration buffer 206 suitably comprises various administrative data, including various telephone extensions used in the context of the voice response unit (VRU) implemented by ADS 100.

Employee buffer 208 suitably comprises data corresponding to the various dealer employees having access to a ADS 100, including each employee name, password, telephone extension, mailbox extension, and the like.

Group message master buffer 210 and group message detail buffer 212 comprise group message information useful in performing conventional VRU functions as is known in the art.

Closed call buffer 214 and closed parts buffer 216 receive call records and parts records, respectively, from open call 202 and open parts buffer 204 during the call closing process, described below in greater detail in conjunction with FIG. 10.

Similarly, call history buffer 218 and parts history buffer 220 are configured to receive call records and parts records, respectively, from closed call buffer 214 and closed parts buffer 216 during the call closing process, described below in conjunction with FIG. 10.

Message queue 222 functions, inter alia, as a shared memory sector. More particularly and with momentary reference to FIG. 4, one of respective messages 222(a)–222(g) is placed in message queue 222 from time to time, as discussed in greater detail herein. Each time a message is placed in message queue 222, it is detected by a particular program to initiate a sequence of events. In this way, message queue 222 functions to coordinate cooperation among various applications and programs, as discussed below. For example, "MQ_OPEN_CALL" message 222a is written into message queue 222 by VRU 234 and detected by host interface 240. Similarly, message "MQ_NOTIFY_OMD" 222(d) is placed into message queue by Closed D 238 and detected by host interface 240, and so on.

Last call file 224 contains a service call history message, as discussed in greater detail below in conjunction with FIG. 5.

Voice message file 226 comprises voice messages utilized by VRU 234, as discussed in greater detail in conjunction with, inter alia, FIGS. 3 and 5.

SCO Unix 232 comprises the operating system utilized by ADS 100.

VRU 234 comprises the voice response control software implemented by ADS 100 and discussed below in conjunction with, inter alia, FIGS. 3, 5 and 10.

IPC manager 236 comprises application software for coordinating various of the programs discussed herein.

Close D program 238, also known as the closed call deamon, comprises an applications program for facilitating data transfer in connection with the closing of a call, as discussed below in conjunction with FIG. 10.

Host interface program 240 facilitates data transfer between ADS 100 and host computer 126, as discussed in greater detail below in conjunction with, inter alia, FIGS. 3, 5 and 10.

Off-line interface program 241 and on-line interface program 243 facilitate, inter alia, various facsimile functions, as described below, for example in conjunction with FIG. 8.

Dispatcher customer mailbox 254 suitably contains voice mail messages left by customers and accessed by dispatchers, as discussed below in conjunction with FIG. 3.

Technician's mailbox file 252 and operator's mailbox file 256 suitably comprises of technicians and operators respectively, and serve as storage space for voice mail messages sent to a technician or an operator. In accordance with one aspect of the present invention, these mailboxes may be different from the mailbox of an individual who may be either a technician or an operator; that is, an operators' mailbox or a technicians' mailbox, as used in the context of files 256 and 252, respectively, refer to mailboxes dedicated to the administrative position "operator" and the administrative position "technician" as opposed to an individual's personal mailbox.

Caller identity buffer 258 suitably comprises, in accordance with the preferred embodiment of the invention, a single record buffer which holds the identity of the particular caller interacting with VRU 234 at a particular time, and may be updated in accordance with the "amnesia" function described in detail below in conjunction with FIG. 3A.

C-ISAM program 260 comprises the ISAM file maintenance programs used to facilitate the building, maintenance, and interaction among the various files, buffers and the like as discussed herein.

Per diem buffer 262 suitably comprises data corresponding to equipment which is leased on a per diem basis, as described in detail in conjunction with FIG. 8.

Referring now to FIG. 6, hard disc 109 suitably comprises the following respective directories: VOX 604, DATA 606, TMP 608, BPLATE 610, DIR 612, FAX.PENDING 614, HISTORY 616, INTRO 618, MESS 620, ORDER 622, PDS 624, PRODUCTS 626, SUPPLIES 628, and SCHEMATICS 630.

VOX 604 is used to hold voice data, for example, the various prompts, menus, commands and the like used in conjunction with the interactive voice response (IVR) aspects of the present invention, discussed in greater detail below. In addition, various alpha-numeric voice segments, discussed in greater detail below in conjunction with, inter alia, step 528 of FIG. 5, are stored in VOX 604.

DATA 606 comprises the data files corresponding to respective buffers 202–220 of FIG. 2A.

TMP 608 functions as a working space, or a "scratchpad", to facilitate the various processes carried out by ADS 100.

Facsimile images, for example, fax cover sheet templates are suitably stored in BPLATE 610.

DIR 612 contains a library of voice entry names, i.e., a directory of the spoken name of each individual having a voice-mail box controlled by ADS 100.

Outbound facsimiles (faxes) are assembled and transmitted via FAX.PENDING file 614. In particular, fax templates are copied into FAX.PENDING file 614 from BPLATE 610, whereupon the facsimile data is assembled, (e.g., the name and address of the intended recipient of the fax, the sender of the fax, and any messages accompanying the fax). The fax documents are thereafter transmitted to the receiver from FAX.PENDING 614.

HISTORY 616 contains a brief comment from the technician regarding each completed service call.

INTRO File 618 contains a library of voice-message introductions for the various mailbox holders (e.g., "Hello this, is John Smith. If you would like to leave a message . . .").

MESS 620 contains a file of all voice messages, including messages from the customer requesting a service call, messages from a dispatcher to a technician, messages from a technician to a dispatcher, and the like.

ORDER 622 contains data regarding orders for additional supplies.

PDS 624 contains data pertaining to parameter driven software.

PRODUCTS 626 contains facsimile image data corresponding to sales brochures, promotional literature and the like pertaining to a dealer's products and/or services for facsimile to the dealer's customers.

SUPPLIES 628 contains facsimile image data pertaining to supplies available to customers from the dealer.

SCHEMATIC 630 contains image files for a schematic drawings pertaining to various machine components, for example, for retrieval by technicians via facsimile while servicing a call. In this way, technicians need not carry large, cumbersome books of schematics (which are often outdated) as they make service calls; by accessing SCHEMATICS 630 as discussed in greater detail below, the technician may retrieve via facsimile only those schematic drawings necessary to successfully complete a service call.

As discussed in greater detail below, the various files resident in hard disc drive 109 are selectively accessed, via disc and tape controller 108, on an as needed basis.

The manner in which the various hardware and software elements described above interact will now be described in the context of a preferred exemplary embodiment of the present invention.

Referring now to FIGS. 1, 2A and 3A, ADS 100 implements, inter alia, the function of a voice response unit (VRU) under the control of VRU 234. In this regard, the VRU functions of ADS 100 may be accessed by, for example, customers (FIG. 3A, step 306) calling in to report an equipment malfunction for which service is desired, a dispatcher (step 314) to create an "open call" record and assign the open call record to a technician, as well as by a technician (step 302) to either retrieve a service call assigned to him or to "close" a service call which he has just completed, as discussed below.

In accordance with one aspect of the present invention, ADS 100 may be conveniently described in the context of the chronology of events surrounding a service call, from the point of initiation of a service call by the customer, through the completion (closing) of the service call by the technician.

With continued reference to FIG. 3A, a service call may be initiated when a customer telephones the dealer, for example to report an equipment malfunction, whereupon the customer is connected to a dispatcher's telephone extension for a live conversation with the dispatcher (step 310). The customer may be connected to the dispatcher's telephone extension in any number of ways, for example, by dialing the dispatcher's extension directly and being connected to the dispatcher's extension through the telephone company's central office switch. Alternatively, the customer may be connected to the dispatcher's telephone extension by dialing the dispatcher's extension from within the VRU associated with ADS 100 (described in greater detail below), or by being transferred to the dispatcher by the dealer's receptionist or telephone operator.

In any event, the dispatcher discusses the equipment (e.g., photocopier) malfunction with the customer, and elicits from the customer certain information, including the equipment identification number of the malfunctioning machine, the failure type, the machine status, and the like. The various information solicited from the customer by the dispatcher will be discussed in greater detail below in conjunction with an exemplary open call record 203.

Upon obtaining the necessary information from the customer, the dispatcher manually inputs this data into host computer 126 via keyboard 101(b) of data entry unit (DEU) 101 (step 312). Upon entry of the data pertaining to the service call into host computer 126, host computer 126 assigns a six-digit "call I.D. Number" to the call, comprising a two-digit hour code, a two-digit minute code, and a two-digit second code (see field no. 2 of Table 1, below). For dealers which maintain business hours of less than 12 hours a day, a 12 hour clock may be employed; alternatively, a 24 hour clock may also be employed, for example, by dealer's which operate more than 12 hours per day.

Upon entering the data for a call into OMD 126 via DEU 101, the dispatcher transitions from keyboard 101(b) to telephone keypad 101(a) (step 313), and accesses the VRU function of ADS 100 (step 314).

More particularly, the dispatcher enters a predetermined telephone extension via telephone keypad 101(a). The corresponding DTMF signals generated by DEU 101 are applied to one of telephone lines 123, and converted to digital signals by voice board 122. Under the control of CPU 102, the converted signals are applied to memory 106, via bus 104, and VRU 234 is thereby accessed (step 314).

Upon accessing VRU 234, a prerecorded voice welcome is performed (step 316).

More particularly, VRU 234 causes a predetermined welcome message to be retrieved from VOX 604 on hard drive 109, whereupon this message is transmitted via disc and tape controller 108 to voice message file 226 of memory 106. Under the control of VRU 234, this prerecorded voice message is retrieved from voice message file 226 and applied to voice board 122. Voice board 122 converts this voice message data into a human audible welcome message and transmits the voice signal over telephone line 123 so that the message is heard by the person accessing the voice response unit (e.g., the dispatcher).

In accordance with one aspect of the invention, VRU 234 is suitably configured such that person accessing the VRU function of ADS 100 may bypass certain prompts (e.g., the VRU welcome, step 316), for example by depressing a predetermined key and skipping the welcome at any time during the welcome message.

Following the VRU welcome message, the VRU main menu is presented (step 317). In response to the VRU main menu, the user may enter a technician SAN (secret access number) to access a technician menu process (step 318C; see FIG. 5), a dispatcher SAN to enter a dispatch menu process (step 318B), or a voice-mail SAN to enter a voice-mail process (step 318D). More particularly and with momentary reference to FIG. 1, a caller may select various options within the VRU feature by depressing predetermined keys on his telephone keypad, and thereby generate a predetermined DTMF signal. The DTMF signal is received at one of telephone lines 123, and converted by voice board 122 into corresponding digital signals. The digital signals are transmitted by voice board 122 along bus 104 and interpreted by VRU 234. In response to these converted DTMF signals, VRU 234 implements the selected processing step.

In a preferred embodiment, all technicians share a single, unique technician SAN, all dispatchers share a single, unique dispatcher SAN, and all voice-mail users utilize a single, unique voice-mail SAN, although any desired allocation of SANs may be conveniently employed. If a SAN is not entered at the VRU main menu stage, the system is suitably configured to automatically enter the main menu process (step 318A).

More particularly, the present inventors have determined that under certain circumstances it is desirable to not prompt the entry of a SAN; rather, individuals such as technicians, dispatchers, managers, and other employees of the dealer are aware of the SANs and the various voice-mail, technician, and dispatch menu processes. Hence, these individuals may simply enter an appropriate SAN at any time during the VRU main menu and thereby access a desired menu process. Customers and other individuals outside the dealer's organization, on the other hand, desirably proceed directly to the main menu process (step 318A).

Once a caller is in the main menu (step 318A), he may simply hang up (step 352), enter the amnesia processing feature (step 354), replay to the VRU main menu (step 356) or engage in further processing (step 358).

Step 354 (the "amnesia" function) essentially permits the user to redefine his privilege and/or authorization without having to disconnect from and reconnect to the VRU. In particular, employee buffer 208 comprises, inter alia, information pertaining to each dispatcher, technician, and other employees of the dealer who utilize the VRU. Employee buffer 208 suitably includes information pertaining to each employee's extension, password, and privilege or authorization level. When an employee enters his extension and password (e.g., at step 320 or step 502), a corresponding record is written into caller identity buffer 258. Based on the information in caller identity buffer 258, VRU 234 interrogates employee buffer 208 to verify whether the particular caller (e.g., dispatcher, technician) is properly authorized to access that particular function on the VRU.

Recognizing that a particular employee may need to function in more than one capacity, i.e., the same individual may require access to the technician's technician menu process (step 318C) as well as the dispatch menu process (step 318B), the amnesia function permits an employee to update the contents of caller identity buffer 238 "on the fly" and thereby transition from one area on the VRU to another without having to disconnect from and reconnect to the VRU.

More particularly, upon accessing the amnesia function (FIG. 3A, step 359), caller identity buffer 258 is updated to a null condition. This has the effect of causing the VRU to "forget" who the caller is and, hence, the caller's corresponding privilege level. Upon entering step 359, VRU 234 prompts the caller to enter a new extension number and password. In this way, an employee who previously entered the VRU using, for example, a technician extension/password combination may now update (change) his status by entering a dispatcher/extension combination and continue interacting with the VRU. VRU 234 revalidates the newly entered data against employee buffer 208, as discussed above.

In an alternate embodiment, a user need not enter a new extension/password combination at step 359; rather, by entering step 359 and nulling caller identity buffer 258, the caller may simply proceed within VRU in an "undefined" caller status. In this way, the caller may move freely throughout VRU until such time as the user desires to enter a restricted area on the VRU or an area which requires a predefined authorization level, at which time VRU 234 will prompt the user for an extension/password combination.

If further processing (step 358) is selected, the caller may enter any desired extension and be transferred to that extension, for example, to the operator, the receptionist, the sales department, the service department, and the like. Moreover, the caller may elect to be transferred to a telephone extension to speak with a human being, or he may elect to be transferred directly to a voice-mail box extension to leave a voice message. Indeed, if the caller elects to be transferred to a telephone extension, he may nonetheless be subsequently be transferred to a voice-mail box extension if the telephone extension does not answer.

In any event, if the caller is routed to a voice-mail box, he may leave an appropriate message in that voice-mail box (step 360). In accordance with a preferred embodiment of the invention, the voice-mail box feature permits the caller to perform a number of editing functions on his voice-mail message, for example he may press a first key to listen to his message, another key to erase his message, another key to append to his message, or yet another key to record a new message. In any event, once the voice message function is completed, he may either hang up or return to the main menu process at step 318A.

In accordance with a further aspect of the present invention, if the caller desires to leave a voice-mail message pertaining to a service call at step 360, VRU 234 may be configured to provide the caller with yet additional options. For example, VRU 234 may prompt the caller to request a service follow-up feature, for example a fax confirmation, return telephone call from a service representative, or the like. More particularly, VRU 234 may be configured to retrieve a predetermined voice prompt asking the caller to enter a fax number or a telephone number as appropriate.

In accordance with a further aspect of the present invention, if the customer leaves a service message at step 360, the message is advantageously stored in dispatcher customer mailbox 254. As discussed in greater detail below, a dispatcher may subsequently retrieve and listen to this message and, based on the message content, initiate an open call record 203 (see step 305). In this regard, if the customer indicates (via interactive prompting from VRU 234) that he would like to leave a voice-mail message with the service department in regards to a service call for a malfunctioning machine, VRU 234 is desirably configured to prompt the customer to enter certain specific information regarding the malfunction through the user's telephone keypad, for example, the equipment I.D. number, the nature of the equipment failure, the status of the equipment, and the like. As discussed in greater detail below in conjunction with open call buffer 202, VRU 234 may advantageously be configured to present the customer with predetermined menu selections describing the nature of the malfunction (e.g., ran out of toner, paper jam, etc.) and the nature and the current status of the machine (functioning properly, functioning with intermittent problems, functioning with poor quality, out of commission, and the like).

Alternatively, at step 360 the caller may leave a message for the service department (or any other extension) in the form of a voice message, only or in addition to a message entered via interactive prompting by the caller via the caller's telephone keypad.

Returning now to step 317, if a voice-mail SAN is entered, VRU 234 enters conventional voice-mail processing (step 318D), such that employees and others associated with the dealer may engage in standard voice-mail transactions.

If a dispatcher SAN is entered at step 317, the dispatch menu process is initiated (step 318B).

More particularly and with reference to FIG. 3B, upon entering the dispatch menu process, VRU 234 prompts the user (dispatcher) for a dispatcher extension and a dispatcher password to ensure that the caller has proper authority to enter the dispatch menu process (step 320). More particularly, the dispatcher extension and dispatcher password are validated with reference to employee buffer 208; if the dispatcher extension and dispatcher password entered by the caller are not indicated as valid in employee buffer 208, the caller is suitably denied access to the dispatch menu process.

Upon validating the dispatcher extension and dispatcher password (step 320), VRU 234 presents the user with the dispatch menu (step 322). From the dispatch menu (step 322), the caller may return to the VRU main menu (step 317) by entering an appropriate DTMF code, or may engage in further processing. In accordance with the illustrated embodiment, the dispatcher may open a customer call, i.e., create an open call record 203 within open call buffer 202 to initiate a service call, in response to either a live conversation with a customer (i.e., pursuant to step 310) or in response to a voice-mail message in which a customer requests a service call (i.e., pursuant to step 304).

From the dispatch menu (step 322), the dispatcher may return to the VRU main menu at step 317, or engage in further processing. More particularly, if the dispatcher desires to review voice-mail messages recorded by customers pertaining to a request for a service call, the dispatcher selects the open customer call option (step 325, described in greater detail below). If on the other hand, a service call is to be initiated pursuant to a live conversation between the dispatcher and the customer (or other appropriate persons), the dispatcher records a dispatcher message and opens a customer call (step 324), also discussed in greater detail below. Alternatively, the dispatcher may review a technician's slot (step 326) or retrieve a particular call record (step 327). Finally, the dispatcher may simply exit the system (hang up), or return to the dispatch menu at step 322.

Referring now to step 324, when a dispatcher has entered the appropriate data pertaining to a requested service call into host computer 126 (see step 312), the dispatcher may then initiate a service call (i.e., open a customer call record 203 in buffer 202) by recording a voice message for the technician pertaining to the service call, assigning the service call to a particular technician, and assigning a priority to the call.

The criteria by which a dispatcher assigns a call to a particular technician include, inter alia, the location of customer requiring service, the nature of the equipment malfunction, the skill level of the technician, and various other objective and subjective parameters typically applied in the dispatching decision making process. In the context of the present invention, at step 324, VRU 234 then prompts the dispatcher to enter the call I.D. number (Table 1, field no. 2) and record a voice message to verbally explain the service call to the technician. If desired, various known voice-mail features may be made available to the dispatcher at this time, for example the ability to amend, delete, replay, or append to the voice message (step 324). The dispatcher's voice-mail message to the technician is suitably stored at MESS 620 for subsequent retrieval by the technician when he picks up the call, as described in greater detail below. VRU 234 then prompts the dispatcher to enter a technician code, for example, a six-digit number corresponding to a particular technician. More particularly, VRU 234 retrieves, via disc and tape controller 108, an appropriate voice prompt from VOX 604 and transmits the prompt, via bus 104 into voice message 226 of memory 106. VRU 234 subsequently retrieves the prompt from memory 106 and applies the prompt via bus 104 to voice board 122. Voice board 122 speaks the prompt such that the dispatcher hears a voice prompt requesting the dispatcher to enter a technician code.

The dispatcher enters the technician code via telephone keypad 101(a), whereupon the corresponding DTMF signals are applied to one of telephone lines 123 and received by voice board 122. Corresponding digital signals are thereafter output by voice board 122 onto bus 104. VRU 234 receives the digital signal indicative of the technician code and applies it to field 10 of open call record 203 in open call buffer 202. In a similar manner, VRU 234 prompts the dispatcher to prioritize the call within that technician's slot, for example by assigning a two-digit (0–99) message order (priority) to the call. This priority information is loaded into field 30 in open call record 203, as described above.

Upon completing step 324, the dispatcher has effectively initiated the service call process by creating an open call record 203 for the current call within an open call buffer 202. More particularly and with momentary reference to FIG. 2B, open call buffer 202 is suitably an ISAM (indexed sequential access method) index file wherein each record 203 within buffer 202 comprises a predetermined number of fields (e.g., 64; see Table 1). As of the point in time at which the dispatcher opens up a particular record 203 in open call buffer 202, only certain of the fields contain actual data. As discussed subsequently, the remaining fields are conveniently automatically filled in from data resident in host computer 126 upon establishing a host interface link between ADS 100 and host computer 126.

With continued reference to FIG. 2B, four exemplary fields of a plurality of respective records 203 are illustrated, namely, field number 3 (the call key), field number 10 (the extension number), field number 31 (message file name), and field number 63 (extension number/type call/call status/ message order).

These four fields are merely exemplary and are set forth in FIG. 2B for purposes of illustration to facilitate this discussion.

When a record 203 is opened within open call buffer 202, VRU 234 assigns a sequential call key (field number 3) to the call so that the call may be tracked by VRU 234. Within momentary reference to FIG. 2B, each record 203(a)–203(n), where n equals the number of records within open call buffer 202, contains any desired number of fields corresponding to predetermined information relating to each service call. In the illustrated embodiment, each record 203 within open call buffer 202 suitably comprises 64 fields, as shown in the following Table 1.

TABLE 1

| FIELD NUMBER | FIELD NAME | FIELD TYPE | FIELD SIZE |
| --- | --- | --- | --- |
| 1 | Call Status | Character | 2 |
| 2 | Call I.D. Number | Character | 6 |
| 3 | Call Key Number | Numeric | 10.2 |
| 4 | Service Call Rpt. No. | Character | 7 |
| 5 | Primary Failure | Character | 4 |
| 6 | Miles Driven | Numeric | 4 |
| 7 | Equipment Meter | Numeric | 11 |
| 8 | Service Copies | Numeric | 11 |
| 9 | Employee Number | Character | 6 |
| 10 | Extension | Character | 6 |
| 11 | Message Status | Character | 3 |
| 12 | Type Call | Character | 2 |
| 13 | Billing Amount | Numeric | 10.2 |
| 14 | Service Program Type | Character | 3 |
| 15 | Equipment Identification | Character | 6 |
| 16 | Comment Line 1 | Character | 35 |
| 17 | Comment Line 2 | Character | 35 |
| 18 | Host Comment Line 1 | Character | 30 |
| 19 | Host Comment Line 2 | Character | 30 |
| 20 | Host Comment Line 3 | Character | 30 |
| 21 | Host Comment Line 4 | Character | 30 |
| 22 | Number Times Printed | Numeric | 4 |
| 23 | Billing Status | Character | 3 |
| 24 | Model | Character | 10 |
| 25 | Serial Number | Character | 15 |
| 26 | Average Usage | Numeric | 11 |
| 27 | Call symptom | Character | 6 |
| 28 | Call Type | Character | 6 |
| 29 | Charge Call Code | Character | 1 |
| 30 | Message Order | Character | 4 |
| 31 | Message File Name | Character | 15 |
| 32 | Sender | Character | 6 |
| 33 | Customer Name | Character | 30 |
| 34 | Customer Address - Line 1 | Character | 30 |
| 35 | Customer Address - Line 2 | Character | 30 |

TABLE 1-continued

| FIELD NUMBER | FIELD NAME | FIELD TYPE | FIELD SIZE |
| --- | --- | --- | --- |
| 36 | Customer City | Character | 25 |
| 37 | Customer State | Character | 2 |
| 38 | Customer Zip Code | Character | 9 |
| 39 | Customer Contact | Character | 30 |
| 40 | Customer Area Code | Character | 3 |
| 41 | Customer Phone | Character | 7 |
| 42 | Customer Key Operator | Character | 30 |
| 43 | Call Deposit Time | Character | 5 |
| 44 | Call Deposit Date | Date | 6 |
| 45 | Call Assign Time | Character | 5 |
| 46 | Call Assign Date | Date | 6 |
| 47 | Call Open Time | Character | 5 |
| 48 | Call Open Date | Date | 6 |
| 49 | Call Pick Up Time | Character | 5 |
| 50 | Call Pick Up Date | Date | 6 |
| 51 | Call Dispatch Time | Character | 5 |
| 52 | Call Dispatch Date | Date | 6 |
| 53 | Call Arrive Time | Character | 5 |
| 54 | Call Arrive Date | Date | 6 |
| 55 | Call Comp Time | Character | 5 |
| 56 | Call Comp Date | Date | 6 |
| 57 | Call Drop Time | Character | 5 |
| 58 | Call Drop Date | Date | 6 |
| 59 | Call Assist Extension | Character | 6 |
| 60 | Technician Labor Amount | Numeric | 7.2 |
| 61 | Omd Labor Amount | Numeric | 7.2 |
| 62 | Type Call/Ext/Mess Order | Character | 12 |
| 63 | Ext/Type Call/Call Stat/ Message Order | Character | 14 |
| 64 | Ext/Type Call/ Call Key | Character | 21 |

Upon opening a call record 203 for a particular service call, the call status (field number 1) is designated by VRU 234 as "OC" (corresponding to an "open call").

With continued reference to FIG. 3B, after a dispatcher has opened the call, i.e., after the dispatcher has created an open call record 203 in open call buffer 202 pertaining to the current call (step 324), the dispatcher may either hang up or continue with additional processing, for example by returning to the dispatch menu (step 322) or transferring to another extension. Upon completing step 324, VRU 234 facilitates communication between ADS 100 and host computer 126 to fill in the remaining fields in record 203 in accordance with data from host computer 126.

Referring now to FIG. 3C, upon opening a call record 203 in open call buffer 202 for the current call, VRU 234 sends a message to message queue 222 to initiate communication between ADS 100 and host computer 126. More particularly and with momentary reference to FIG. 4, VRU 234 sends the message "MQ_OPEN_CALL" (message 222(a)) to message queue 222 (step 330). Message queue 222 suitably comprises a shared memory sector, such that when a message is placed therein, one or more software modules (e.g., Close D 238, host interface 240) having access to message queue 222 may act upon the message, as appropriate.

In response to "MQ_OPEN_CALL" message 222(a) in message queue 222, host interface 240 establishes a communication link between ADS 100 and host computer 126 (step 332). More particularly, host interface 240 establishes an electronic data path at multichannel serial communications port between ADS 100 and host computer 126.

Once the host interface link is established, data from host computer 126 is written to call record 203 to fill in the remaining data fields (step 334). In this regard, communication between host computer 126 and the particular call record 203 within open call buffer 202 is coordinated by using the call I.D. number (field No. 2, Table 1) which was initially assigned to the call by host computer 126 when the dispatcher initiated the call record process in host computer 126 (see step 312). In filling in the data fields within call record 203, host computer 126 ports data to ADS 100 pertaining to the equipment I.D. number, the model and serial number of the equipment, the contract type, customer name, address, phone number, zip code, and any other data comprising call record 203 (See Table 1) which was not elicited from the customer, either through live conversation with the dispatcher or through the VRU feature of ADS 100.

Returning now to FIG. 3B, recall that when the dispatcher is presented with dispatch menu 322, the dispatcher may essentially elect one of four processing routes, namely: record dispatcher message and open call (step 324); open customer call (step 325); review technician's slot (step 326); or retrieve a particular call record (step 327).

Returning to dispatch menu step 322, the dispatcher may select step 325, thereby accessing dispatcher customer mailbox 254. Once mailbox 254 is accessed, the dispatcher may scroll through any customer messages resident within mailbox 254 utilizing various voice messaging techniques, including message replay, message skip, play next message, pause, fast forward, rewind, and the like. Indeed, the dispatcher may elect not to open a call after reviewing the customer voice mail messages, for example if none of the messages are of a nature requiring the opening of a service call.

Once within step 325, the dispatcher may also respond to a request from the customer for a return call (or fax) confirming that the customer voice message was reviewed and, if requested by the customer or otherwise desired by the dealer, that a service call record was being opened for the customer's call.

In the event the dispatcher desires to create a call record 203 pursuant to step 325, the dispatcher essentially completes the procedures outlined in step 312, namely, the dispatcher enters information corresponding to predetermined fields within call record 203 (e.g., equipment I.D., failure type, machine status, date and time of call, and the like) into host computer 126 through keyboard 101(b) of data entry unit 101. The dispatcher then assigns the call to a particular technician and assigns a message order to the call in the same manner as discussed above in connection with step 324. In addition, however, the dispatcher may append his/her own message to the customer message, if the customer message is sent to the technician's slot. In any event, once the dispatcher leaves a voice message for the technician (one or both of a dispatcher voice message and a customer voice message) and assigns the call to a technician and prioritizes the call, the dispatcher may hang up or engage in further processing, for example by returning to dispatch menu 322, dialing another extension, or the like. Host interface 260 then fills in the remaining data fields in call record 203 (step 328), as set forth above in connection with FIG. 3C.

Returning to the dispatch menu (FIG. 3B; step 322), the dispatcher may also elect to review a technician's slot (step 326). More particularly, in accordance with a preferred embodiment of the present invention, a technician's "slot", i.e., his service call "mailbox", may be conveniently implemented in virtual memory. That is, each time an open call record is created, ISAM 258 adds a new call record 202 to open call buffer 202. When a dispatcher assigns a call to a particular technician in open call buffer 202 by designating that technician's extension number in field 10, that call is added to technician's "slot". If a single record 203 within open call buffer 202 corresponds to a particular technician, that technician has one call in his "slot". Each time a subsequent call record 203 is added to buffer 202 which designates that same technician, his "slot" thereby increases. As subsequent calls designating that particular technician are added to open call buffer 202, and as that technician closes various calls (thus deleting them from open call buffer 202), the size of that particular technician's slot increases and decreases accordingly. When the technician closes out the last remaining call for which he is designated in open call buffer 202, his "slot" ceases to exist until such time as a subsequent call is added to open call buffer 202 designating him (at which time his "slot" spontaneously springs back into existence).

Alternatively, actual sectors may be set up in memory dedicating memory space to each technician, such that calls assigned to a particular technician may simply be stacked within that technician's service slot. Moreover, the order in which a technician may retrieve the calls from his slot is determined by the four digit message order (priority) (field No. 30, Table 1) assigned to the calls by the dispatcher. In a preferred embodiment, the number of calls which a technician may retrieve at a time is a configurable variable, for example one. In this way, a technician may not "look ahead" at more than one call in his slot queue. This may be desirable in circumstances where it is anticipated that the calls within various technicians' slots will be reassigned from time to time. By limiting a technician's look ahead capability, he is less likely to "jump the gun" and drive to a customer site from which he has been reassigned since he reviewed his messages.

With continued reference to step 326, the dispatcher may review the calls within the technician's slot, for example, by entering the technician's extension number in response to a prompt from VRU 234. VRU 234 then searches open call buffer 202, and specifically field 10 of each record 203, for each instance of that particular technician's extension; VRU 234 then reads field 31 to obtain the voice message file name associated with each call within a particular technician's slot. The voice messages are retrieved from MESS 620 of disc 109 and temporarily stored in voice message file 226 for subsequent review by the dispatcher, for example one message at a time as requested by the dispatcher. In this regard, the dispatcher may conveniently "scroll" the messages within a technician's slot, for example in a manner analogous to scrolling voice messages in one's own voice mailbox; that is, the dispatcher may replay a message, skip ahead, fast forward, rewind, and even remove messages from a technician's mailbox by simply reassigning the call record to a different technician.

The final option available to the dispatcher from dispatch menu 322 in accordance with the illustrated embodiment involves retrieving a particular call record (step 327). More particularly, step 327 permits the dispatcher to engage in various processing functions with respect to a particular call (replay, pause, fast forward, rewind, delete and the like), or "select" the call for further processing. When a call is so selected in step 327, VRU 234 permits the dispatcher to redefine the call priority (i.e., change the message order; field 30, Table 1); append a message to the dispatch message, change the dispatch message, and otherwise amend the message and/or the designated technician assigned to the call.

In a preferred embodiment of the present invention, a dispatcher may employ step 327 independently or in conjunction with step 326, to facilitate the optimum assignment of each call to a technician. For example, if a dispatcher retrieves a "hot" call via step 327, i.e., a call which requires urgent attention, the dispatcher may initially elect to send the call to a particular technician, for example technician no. 000117. However, the dispatcher may wish to return to dispatch menu 322 and, via step 326, review some of the other messages within technician 000117's service slot to determine the relative priority of the various calls within technician 000117's slot. If technician 000117 already has several "hot" calls, the dispatcher may elect to send the current "hot" call retrieved via step 327 to yet a different technician; alternatively, the dispatcher may elect to reassign various of technician 000117's existing slotted calls to other technicians to thereby free up technician 000117's time to handle a particular "hot" call. This is especially advantageous in circumstances where a certain technician (e.g., technician 000117) is the technician most familiar with a particular customer's facility; hence, the dispatcher may retrieve a particular call corresponding to that customer facility via step 327, and assign it to technician 000117 as a top priority call. In the event technician 000117 already has one or more urgent calls in his slot, the dispatcher may review those calls via step 326 and selectively reassign those calls, as appropriate.

Accordingly, a customer call may be opened by the dispatcher either through step 324 (pursuant to a live conversation with a customer) or through step 325 (pursuant to a customer voice message). In either case, a call record 203 corresponding to that call will be opened in open call buffer 202, and the various fields comprising call record 203 updated with information from host computer 126, as described above in connection with FIG. 3C. Having prioritized and assigned the call to a technician, the dispatcher's involvement with the call record is essentially terminated (unless a dispatcher subsequently retrieves the call pursuant to step 326 or step 327). In the context of the present invention, the next action taken with respect to such an "open" call by ADS 100 is when a technician "picks up" the call, as described below in connection with FIG. 5.

In prior art systems, a technician picks up a call by either calling a dispatcher or by receiving a call from a dispatcher. The technician and the dispatcher engage in a dialogue pursuant to which the dispatcher conveys the relevant information to the technician. Quite often the dispatcher puts the technician on hold one or more times during the conversation, particularly during peak call periods or to permit the dispatcher to take a customer call, under the theory that it is more desirable to put an employee on hold than it is to put a (perhaps angry) customer on hold. Even if the dispatcher does not place the technician on hold, the dispatcher typically must speak slowly and/or repeat certain critical information to the technician several times to allow the technician to manually record the information to facilitate an orderly dispatch.

In accordance with one aspect of the present invention, the need for a real time conversation between the dispatcher and the technician is substantially eliminated. By placing an open call record in a technician's slot, the dispatcher may quickly return to her other duties. By the same token, the technician may retrieve service call requests from his slot at his convenience, uninterrupted by dispatcher distractions from customers, technicians and other dispatchers. In this sense, the technician's slot (i.e., those calls assigned to a particular technician in call buffer 202) functions in the manner of a "FIFO" (first in—first out register), except that the "first out" aspect is controlled by the message order (field no. 63) assigned to each service call by the dispatcher.

In accordance with a further aspect of the present invention, the peaks and valleys normally present in the dispatchers' and technicians' work day are largely smoothed out to the extent the dispatcher assigns calls to a technician without interfacing with the technician, and further wherein the technician retrieves service calls from his slot without having to interface directly with the dispatcher. This "buffer" feature allows both the dispatcher and the technician to execute their respective duties with dramatically enhanced efficiency.

With momentary reference to FIG. 3A, a technician may directly access the VRU function of ADS 100 by dialing the telephone extension assigned to the VRU (step 302). Once the technician has accessed the VRU main menu (step 317), he may enter the technician SAN and thereby initiate the technician main menu process (step 318C).

Referring now to FIG. 5, upon accessing the technician menu process, VRU 234 prompts the technician for his extension number and password (step 502). VRU 234 validates the technician's extension and password by comparing the data entered by the technician against employee buffer 208, in a manner analogous to that set forth above in connection with step 320. Upon validating the technician's extension and password, VRU 234 presents the technician with a technician's menu (step 504).

From technician menu 504, the technician may enter the voice mailbox function of VRU 234 (step 508), retrieve the next call (step 506), close a call (step 510; discussed in greater detail in conjunction with FIG. 10), or engage in further processing (step 512). In particular, step 512 permits the technician to select from a variety of VRU processes such as those discussed herein, including switching to any desired extension, returning to VRU main menu 317, transferring directly to a dispatcher, and the like.

If the technician selects step 508, VRU 234 permits the technician to access his voice-mail messages and otherwise perform known voice-mail processing functions (step 509). Thus, from technician's menu 504, the technician may, inter alia, enter a mailbox code (step 508) and access his voice mail messages, or enter a service box code (step 506) and thereby access his service call messages.

With continued reference to FIG. 5, the manner in which an open call is dispatched to a technician will now be described.

In contrast to prior art systems wherein a service call is dispatched to a technician pursuant to a real time telephone conversation between the dispatcher and the technician, ADS 100 permits the technician to independently dispatch an open call by retrieving his next call (step 506), i.e., by accessing the then lowest message order (highest priority) call in his slot. Once a technician selects step 506 from technician menu 504, VRU 234 automatically plays the then current voice message for the technician (step 514).

More particularly, VRU 234 selects the call having the lowest message order (highest priority) corresponding to this particular technician's extension (field no. 10) from open call buffer 202, and identifies the address of the corresponding dispatcher voice message by interrogating field 31 of open call record 203. VRU 234 then retrieves the dispatcher voice message from MESS 620 on hard drive 109 via disc and tape controller 108. Disc and tape controller 108 transmits the voice message from hard drive 109, via bus 104, to voice message file 226 in memory 106. VRU 234 thereafter retrieves the voice message from voice message file 226 and, via bus 104, applies the message to voice board 122. Voice board 122 reproduces the message and applies it to telephone line 123 so that the technician can hear the message (completion of step 514).

After listening to the dispatcher's message corresponding to the technician's then current service call, which may include a customer voice message in addition to or in lieu of a dispatcher's voice message (if the call was entered into buffer 202 via step 325; see FIG. 3B), the technician may then return to the technician menu (step 515), pick up the call, i.e., effect the dispatch function (step 520), or process the current message (step 518).

The technician may select step 515, for example near the end of the technician's working day, when he does not expect to begin any more service calls that day, but when he would like to know the location of his first service call the next morning. He therefore enters technician menu 504, retrieves his next call (step 506) and listens to the message (step 514) to determine the customer location of his first service call the following morning. He then simply returns to the technician menu, knowing where he is scheduled to start his next working day. At that point, he may either write down the relevant particulars or wait until the next morning to do so.

After listening to his current message (step 514), the technician may elect to process the current message (step 518). Accordingly, step 518 permits the technician to engage in various custom message processing functions, for example, the technician may replay the message (step 516), fast forward the message (step 524), pause the message (step 519), or rewind the message (step 522). After processing the message, VRU 234 returns the technician to step 514 which, if desired, may be bypassed by the technician by depressing an appropriate bypass key on his telephone keypad.

With regard to steps 522 and 524, the terms "rewind" and "fast forward" are used, respectively, to indicate that VRU 234 permits a listener to quickly jump to a later portion of the message or to return to an earlier point within a message. In the context of a preferred exemplary embodiment wherein the messages are desirably stored digitally in memory, the terms "rewind" and "fast forward" are, of course, not literally true. Those skilled in the art will appreciate that these terms are merely a shorthand way of quickly moving to a desired point within a message. In accordance with a further aspect of the present invention, the length of time of a backward or forward jump is desirably a configurable parameter, for example on the order of ten (10) seconds.

Processing step 518 is particularly useful in the context of the present invention, for example when a message retrieved by the technician contains a large amount of very detailed information. For example, equipment I.D. numbers, customer names and addresses and other critical information must be unambiguously conveyed from the dispatcher (or other individual leaving the message) to the technician (or other individual retrieving the message). However, it is desirable to permit the individual leaving the message to speak at his or her normal pace, and thereby maximize the efficiency of the individual recording the voice message. By permitting the listener to rewind, pause or advance through the message at the listener's discretion, the relevant information may be unambiguously ascertained by the listener regardless of the pace at which the message was recorded. This allows dispatchers to quickly assemble service call messages, while at the same time permitting a technician to retrieve the relevant data in an organized, unhurried fashion.

Returning now to step 514, once a technician has retrieved the relevant information pertaining to his then current service call, he may elect to pick up the call (step 520). More particularly, when the technician desires to pick up (dispatch) a call, he enters a predetermined code by depressing one or more keys on his telephone pad to thereby generate an appropriate DTMF signal. In this regard, the technician may depress the keypad of any telephone configured to generate the DTMF signals. This feature is particularly useful in the context of the present invention, inasmuch as it relieves the technician of having to carry a dedicated handheld unit with him on service calls. That is, he may interact with ADS 100 through a telephone at his home, a pay phone located anywhere within his service territory, and most conveniently he may interact with ADS 100 through virtually any telephone at a customer service site which is capable of generating DTMF signals.

When the technician desires to pick up the call, he depresses the appropriate signal on his telephone keypad, which signal is received by one of telephone lines 123 and applied to voice board 122. Voice board 122 suitably converts the DTMF signals into appropriate digital data and applies the signal to VRU 234 via bus 104. In response, VRU 234 updates the status of the call in call buffer 202 to indicate that the call has been dispatched, and also initiates an operation whereby the status of the call is further updated in host computer 126.

More particularly, VRU 234 updates the call status in field 1 of open call record 203 (in call buffer 202) from "OC" (open call) to "DI" (dispatched) (step 521). VRU 234 also places message 222(b) (see FIG. 4), namely, "MQ_CALL_DISP", into message queue 222 in memory 106 (step 521(a)). Recalling that message queue 222 functions as a shared memory sector, placing message 222(b) in message queue 222 effectively causes host interface 240 to establish a communications path between ADS 100 (at communication port 124) and host computer 126. Host interface 240 then updates the call status for the then current call from "open" to "dispatched" within host computer 126 (step 527). More particularly, in prior art systems host computer 126 presents the dispatcher (or other human operator) with an update screen at the user's screen display (computer terminal), whereupon the dispatcher may either move the cursor into the appropriate field for manually updating the call status. Alternatively, the dispatcher may simply respond to a specific prompt from host computer 126 to update the call status, depending on the particular configuration of host computer 126. In any event, in accordance with one aspect of the present invention, ADS 100 is suitably configured to replicate this function via host interface 240. Specifically, host interface 240 generates signals which, when applied to host computer 126, replicates the keystrokes entered by the dispatcher to update the call status in host computer 126 in prior art systems. Thus, ADS 100 automatically updates the call status within host computer 126 in a manner which host computer 126 "sees" as keystrokes manually entered from a keyboard normally associated with host computer 126.

After the status of the call is updated to indicate that the call is dispatched in both open call buffer 202 and host computer 126, host interface 240 returns to an idle state and waits for a message in message queue 222 (i.e., one of messages 222(a), 222(b), 222 (d), or 222 (f).

After the call status is updated to reflect the fact that it has been dispatched in both ADS 100 (step 521) and message 222(b) is placed into message queue 222 (step 512(a)), VRU 234 replays the prior service history for the particular pieces of equipment with respect to which the service call is made (step 52).

More particularly, VRU 234 issues instructions which cause CPU 102 to retrieve the last call from hard drive 109. As briefly discussed above, and as discussed in greater detail below in conjunction with FIG. 10, after a technician completes a service call, he generally closes the call by inputting appropriate data pertaining to the nature of the equipment malfunction, any parts required to repair and/or otherwise service the equipment, various billing information and the like, all of which is discussed in detail in conjunction with FIG. 10. In accordance with one aspect of the present invention, VRU 234 permits the technician to record his comments regarding a service call, so that these comments may be retrieved by the next technician servicing the same machine. Indeed, in accordance with a preferred embodiment of the present invention, a technician is required to leave a service history voice message in order that he may properly close a call (see FIG. 10). In this regard, the present inventors have determined that it is advantageous for the technician to listen to one or more prior history calls (if any exist) at the time he receives his current service call, so that he may derive the benefit of his predecessors' previous experience with this same piece of equipment before embarking on a service call to that machine.

Returning now to step 526, the manner in which ADS 100 replays prior history messages for the technician will now be described.

Prior history messages are stored in HISTORY 616 on hard drive 109, and indexed by machine model number and serial number. In this way, even if a machine is moved to different locations or sold to different users, it is still possible to track prior history messages for that machine. That is to say, prior history messages are advantageously not indexed by the dealer's equipment identification number (field 15; See Table 1), inasmuch as equipment identification numbers may change from time to time as the equipment is moved or sold, whereas model numbers (field 24, Table 1) and serial numbers (field 25, Table 1) generally do not change over time. Thus, when a technician picks up a call (step 520), VRU 234 extracts the model number and serial number of the equipment pertaining to the then current call from fields 24 and 25, respectively, of the then current call record 203 in open call buffer 202 in memory 106. The model number and serial number are loaded on to bus 104 and, via disc and tape controller 108, applied as an argument to HISTORY 616 in hard drive 109, whereupon the prior call messages for that particular piece of equipment are retrieved and loaded into voice message file 226 in memory 106. In this regard, it should be noted that the number of LAST CALL™ voice records which are retrieved in step 526 is desirably a configurable variable, ranging from zero (0) to the maximum number of last calls available.

In a preferred embodiment of the present invention, the number of prior calls retrieved at step 526 is configurable as a function of both time and number of calls; that is, both a time period may be established by the dealer as well as a "number of calls" parameter. For example, a dealer may determine that all prior calls recorded within the last predetermined period of time, for example forty five (45) days, one (1) year, or the like, up to a predetermined maximum number will be retrieved. This predetermined maximum number may be independently configured, for example on the order of two (2) to twenty (20), and most preferably in the range of three (3) to five (5).

In accordance with a particularly preferred embodiment, at least one prior call must be retrieved and replayed for the technician, if such a call exists. Thus, it may be said that, in accordance with a particularly preferred exemplary embodiment of the invention, at least one prior call is replayed for the technician each time he picks up a call, and further including all prior calls recorded for a particular machine within the last three months, up to a maximum of three calls.

Once the technician picks up the now current call and listens to the call history (steps 520, 526), VRU 234 affords the technician the option to listen to more detailed information pertaining to the current service call (step 528).

More particularly, at this point open call record 203 within buffer 202 includes a substantial amount of information pertaining to the piece of equipment which is the subject of the service call, as a result of the call record having been updated by host interface 240, as discussed above in conjunction with step 328 (FIG. 3C). Indeed, in accordance with the illustrated embodiment, many or all of the 64 fields of information (see Table 1) pertaining to the service call have been filled in either by the dispatcher or by host interface 240. At step 528, VRU 234 causes ADS 100 to "speak" these various fields to the technician, for example in sequential order, field by field, or as otherwise desired.

More particularly, VRU 234 may permit the technician to request ADS 100 to speak specific fields, for example by entering indicia of the desired fields via the technician's telephone keypad, or the technician may simply listen to each field sequentially until the information in all of the fields has been spoken to the technician, or the technician may simply terminate the speaking process or hang up at any time. Alternatively, VRU 234 may implement various other processing functions including "fast forward", "rewind", "pause", "replay", and the like. In any event, VRU 234 is suitably configured to permit the technician (or other individual listening to detailed call information) to receive detailed information about a particular service call before or during the performance of these service tasks associated with the service call (step 528).

The manner in which ADS 100 communicates the detailed call information to the technician may be implemented in any desirable manner. For example, in alternate embodiments of the invention, the technician may access ADS 100 via modem, for example, by accessing fax board 120 or voice board 122. If the technician interfaces the modem with a facsimile machine or display terminal, a hard copy of the detailed call information may suitably be printed on a hard copy (in the facsimile embodiment) or displayed on a screen (in the computer terminal embodiment).

In accordance with a particularly preferred exemplary embodiment of the present invention, the detailed call information (step 528) is spoken to the technician so that the technician may hear the information using a conventional telephone. In this way, the technician need not carry with him a portable or handheld unit on service calls in order to access detailed call information.

More particularly, VOX 604 suitably comprises, inter alia, voice data corresponding to each of the letters of the alphabet, a variety of numbers, for example the digits zero through nine, teens, twenties, thirties and so on and, if desired, hundreds, thousands, and so forth, depending on the nature of the detailed call data which is desired to be "spoken" by ADS 100 to the technician. Each of these various voice segments are stored in VOX 604 as separate components. VRU 234 retrieves the digital data from the various fields within the appropriate open call record 203 (within open call buffer 202), which data typically includes various ASCII characters, for example alpha characters, numeric characters and various symbols, including "-", ",", ";", "*", "/", "$", "%", ".", and the like. Voice data segments corresponding to the foregoing characters (i.e., digital data corresponding to the spoken words "dash", "comma", "semi-colon", "asterisk", "slash", "dollar sign", "percent", and "period", respectively) are retrieved from VOX 604 within hard drive 109 via disc and tape controller 108 and loaded into voice message file 226. Thereafter, under the control of VRU 234, the speech data is routed via bus 104 to voice board 122, whereupon the voice segments are spoken by voice board 122 and applied to telephone line 123. In this way, the technician may listen to the alphanumeric detailed call information as spoken to him via voice board 122 (step 528).

Alternatively, a voice synthesizer (not shown) may be employed, whereby computer generated synthesized voice is used to "speak" the data to the technician, if desired.

In accordance with a further aspect of the invention, those fields in call record 203 which are spoken by ADS 100 to the technician may be selectively configured by the dealer, such that only certain predetermined fields may be accessed by the technician. This may be particularly appropriate in circumstances where, for example, call record 203 contains information which the dealer would not like the technician to have access to.

When the technician has listened to the desired call detail information, he may complete the dispatch phase by simply hanging up the telephone and departing for the customer site (step 530).

Once the technician has completed the dispatch function, he undertakes to attend to the equipment which is the subject matter of the service call. During the course of servicing/ repairing the equipment, often parts of the machine need to be replaced or repaired. In addition, machines often need to be resupplied with various consumable components, including, for example, toner, paper, lubricating oil, and the like. In prior art schemes, when a technician completes a service call, he typically telephones the dispatcher and "closes" the call by giving the dispatcher detailed information regarding tasks that he had performed, and further regarding any parts or components which he had resupplied or replaced in the equipment.

In accordance with one aspect of the present invention, the technician may "close" a call upon completion of the service call without having to speak with the dispatcher. This permits the dispatcher and the technician to function more efficiently, and reduces customer aggravation by reducing the time which the technician spends on the customer's telephone at the service site.

With momentary reference to FIG. 5A, the technician dials up ADS 100 from any conventional telephone, and accesses technician menu 504 as discussed above. The technician enters the appropriate DTMF signals to select the close call option (step 510).

Referring now to FIG. 10 and Table 2 (set forth below), VRU 234 prompts the technician to enter, on a field by field basis, the information corresponding to selected fields in call record 203 and in the corresponding part record in open parts buffer 204. The technician enters this information and VRU 234 validates this information, preferably on a field by field basis, until all desired information is properly validated (step 1002).

More particularly, VRU 234 extracts suitably succinct voice prompts from VOX 604 on hard drive 109 via disc and tape controller 108, and loads the prompts into voice message file 326 in memory 106. The prompts are thereafter applied via bus 104 to voice board 122, whereupon the prompts are spoken by voice board 122 and applied across telephone line 123 such that they are audible to the technician. In response to the prompts, the technician keys in appropriate data using the telephone keypad associated with the telephone with which he is using to communicate with ADS 100. Specifically, the technician selectively presses keys on his telephone keypad to thereby generate DTMF signals. The DTMF signals are received at telephone line 123 and converted by voice board 122 into corresponding digital signals. The information represented by this digital signals are validated by VRU 234 based on the validation criteria set forth in and discussed below in conjunction with Table 2:

TABLE 2

| Field | Data Type | Format | Length | Required | Validation |
|---|---|---|---|---|---|
| Call ID (Field #2) | digit | fixed | 6 | yes | Must be a valid time, including seconds, based upon 24 hour clock. If the call ID is not found in the VRU, a warning will be provided at the end of the call data. If the call ID is not assigned to your extension number, a warning will be provided and you will be requested to confirm that you want to continue. |
| Equipment ID (Field #15) | alphanumeric | variable | 5 | yes | If the call ID was found in the first step, then this field must equal the equipment ID assigned to the call. |
| Dispatch Date (Field #52) | digit | fixed | 6 | no | If entered, this field must be a valid date. If you skip the field, this field will be set to today's date. If this date is before the date you picked up the call from the VRU, a warning will be provided at the end of the call data. |

TABLE 2-continued

| Field | Data Type | Format | Length | Required | Validation |
|---|---|---|---|---|---|
| Dispatch Time (Field #51) | digit | fixed | 4 | yes | Must be a valid 24 hour clock time. |
| | | | | | If this time is before the date and time that you picked up the call, a warning will be provided at the end of the call data. |
| | | | | | If this time is before the open date and time (call ID), a warning will be provided at the end of data capture. |
| Arrive Date (Field #54) | digit | fixed | 6 | no | If entered, this field must be a valid date, later than or equal to dispatch date. |
| | | | | | If you skip the field, it will be set to the dispatch date. |
| Arrive Time (Field #53) | digit | fixed | 4 | yes | Must be a valid 24 hour clock time, equal to or later than dispatch date and time. |
| Completion date (Field #56) | digit | fixed | 6 | no | If entered, this field must be a valid date, later than or equal to arrive date. |
| | | | | | If you skip the field, it will be set to the arrive date. |
| Completion Time (Field #55) | digit | fixed | 4 | no | If entered this field must be a valid 24 hour clock time, equal to or later than arrive date and time. |
| | | | | | If you skip the field, it will default to the current time (VRU clock). |
| Call Completion | digit | fixed | 1 | yes | One (1) if the call is complete, zero (0) if the call is not complete. |
| | | | | | If this field is zero (not complete), then you will be prompted for parts order data after you enter parts used data. |
| Type Call (Field #28) | alpha-numeric | variable | 1 | yes | Validated against a type call table. |
| Primary Failure (Field #5) | alpha-numeric | variable | 2 | yes | Validated against a primary failure table. |
| Meter Reading (Field #7) | digit | variable | 8 | no | While this field is not required, if it is skipped, a warning will be produced. |
| Miles Driven (Field #6) | digit | variable | 3 | yes | |
| Service Copies (Field #8) | digit | variable | 4 | no | Defaults to zero. |
| SCR Number (Field #4) | digit | variable | 6 | no | Defaults to zero. |
| Assist Extension (Field #59) | digit | variable | 6 | no | Valid technician extension. |
| | | | | | If this field is entered, then you will be prompted for assist used parts. |
| Labor Charge (Field #60) | digit | variable | 7 | no | If entered, the cents' positions must be included without a decimal point. |
| | | | | | This field is used to override the OMD labor charge. |
| Part Quantity | digit | variable | 3 | yes | Negative quantities are indicated by a leading zero. |
| | | | | | If this field is skipped, (by entering just a *) then parts entry for the current category will be closed. If the current category is the final category for this call, then all entry will be closed. |
| Part Number | alpha-numeric | variable | 16 | yes | Must be a minimum length of 4. |
| Part Charge | digit | variable | 7 | no | If entered, the cents' positions must be included without a decimal point. |
| | | | | | This field is used to override the OMD labor charge. |

In accordance with a further aspect of the present invention, non-numeric characters may be entered by the technician via his telephone keypad in the form of corresponding decimal digit pairs in accordance with one or more predetermined algorithms, for example the conversion formulas set forth in FIGS. 7 and 9.

In this regard, presently known DTMF transmission systems are capable of effectively communicating only a limited amount of information through a telephone keypad primarily because only twelve buttons are available on the keypad. Various systems have been developed which rely upon combinations of buttons to indicate non-numeric characters. In order to properly transmit non-numeric data in the context of the present invention, not only is it desirable to transmit alphabetical (and other non-numeric) characters, but alphabetical letters must be distinguished from numeric information. In addition, many parts numbers and descriptions include symbols or lower case letters not normally available on a conventional telephone keypad.

FIG. 7 illustrates a conversion system for transmitting combinations of two keypad buttons (digits) depressed consecutively to indicate transmission of an upper case letter, a lower case letter, or one of several symbols available in the conventional ASCII or EBCDIC character sets. In this regard, it should be noted that, in accordance with one aspect of the invention, it is possible to transmit the actual alphanumeric or symbolic information using only the digit keys on the telephone keypad. In particular, the tones associated with the asterisk (*) and pound sign (#) keys may be used to indicate whether the information which follows should be treated as numerical data or converted into alphabetical characters and symbols. For example, when information is telephonically transmitted to ADS 100 by a technician, DTMF information is initially interpreted by ADS 100 as numerical. When the pound key is depressed, however, subsequent DTMF signals are converted into their corresponding alphabetical characters in accordance with the table illustrated in FIG. 7. When the alphabetical character string is completed, the pound sign key may be depressed again to indicate the end of a non-numeric character string; alternatively, the asterisk key may be depressed to achieve the same purpose.

For example, a technician may have replaced a part in a copier and the information must be transmitted to ADS 100 during the close call sequence. The part number may comprise a series of characters, numbers, and symbols, for example "AG54.5(b)". To transmit this identification number, the technician would begin by depressing the pound sign key (#) to indicate that ADS 100 should translate subsequent DTMF signals into alphabetical characters. After depressing the pound key, the technician would press "01" and "07" consecutively, corresponding to the two-key (two-digit) combinations corresponding to upper case "A" and upper case "G", respectively. Because the next two characters are numerics, the technician would then press the pound key again to indicate the end of the non-numeric character string. The technician will then depress the 5 key and the 4 key to convey the numerical data. The decimal point is a symbol having a corresponding two-key code (see FIG. 7), so the technician presses the pound sign key, followed by 74 (the two-digit symbol for "."), and followed again by another pound key to indicate the end of the non-numeric character string. The technician then presses 5 to transmit the number 5. To transmit the (b) string, the technician depresses the pound sign to initiate the alphabetical character string, followed by 68, 32, and 69, corresponding to the open parenthesis symbol, the lower case b, and the closed parenthesis symbol, respectively. By transmitting information according to this method, the technician can communicate almost any series of characters to ADS 100.

Virtually any desirable non-numeric character, for example, upper and lower case alphabetical characters, as well as various literary, mathematical, and grammatical symbols, may be represented by such a two-digit code. Moreover, a three or more digit code could be similarly employed to accommodate virtually any number of non-numeric symbols.

A particular advantage of the system illustrated in FIG. 7 surrounds the particular sequence of characters and symbols employed. For example, in accordance with one aspect of the present invention, the upper case letters A through Z correspond alphabetically to keypad combinations 01 through 26. In order to simplify the conversion process for lower case letters, keypad combinations 30 through 56, respectively, are employed to represent the lower case alphabet, a through z. In this way, a technician who is familiar with the numerical position of each letter in the alphabet may easily determine the keypad combination for any lower case letter by simply adding 30 to the keypad combination for its corresponding upper case character. Thus, because upper case A intuitively corresponds to keypad combination 01, it is a matter of simple arithmetic to calculate that lower case a corresponds to the keypad combination 31.

The scheme illustrated in FIG. 7 is far simpler for a person to master than the traditional ASCII characters. As described above, the letter "A" intuitively corresponds to the keypad combination 01. In the ASCII character set, however, the upper case A has a decimal equivalent of 65, as is known in the art. The keypad combinations shown in FIG. 7, however, may be easily converted to the ASCII equivalents for computer use by adding the offset values shown in the third column of the table shown in FIG. 7. The information in this column is condensed in FIG. 9 to five simple conditions for conversion to the ASCII character set.

For example, when the technician transmits the upper case "J" character, he uses the keypad combination "10". When this DTMF combination is received by the ADS 100, 64 is simply added to the received value of 10 to arrive at 74. The decimal equivalent of upper case J in the ASCII character set is 74; thus, by automatically converting according to the formula shown in FIG. 9, the DTMF characters transmitted may be easily converted into the ASCII character set for use by the ADS 100.

Returning now to step 1002 of FIG. 10, ADS 100 prompts the technician for various fields of information, in response to which the technician selectively depresses keys on his telephone keypad to transmit the requested information, for example in accordance with the conversion formula set forth in FIG. 12. The criteria used to validate each data field entered by the technician are suitably a function of the nature of the data within each field. In addition, threshold data integrity validation techniques may also be applied to one or more of the data fields. For example, a response which includes an alpha character would likely be an invalid response to a prompt for information regarding a field which requires only a numeric response (e.g., part quantity).

In accordance with one aspect of the present invention, the criteria used to validate the various information transmitted by the technician in response to selected data prompts are set forth in Table 2. Specifically, Table 2A sets forth various criteria used to validate the data corresponding to the call record in open call record 202; Table 2B sets forth exemplary criteria suitably employed to validate responses to data supplied by the technician for the parts record comprising open parts record 204.

In connection with Table 2, note that certain criteria are of a "must be" nature, such that VRU 234 will not permit the validation process to continue unless an acceptable response is received in accordance with the validation criteria set forth in Table 2. Alternatively, VRU 234 may be configured to permit a technician to close a call even though "invalid" data is transmitted by the technician, whereupon ADS 100 suitably generates an error message to be transmitted to appropriate personnel within the dealer's organization, for example via a fax message, voice-mail message, or the like.

Once the technician has completed entering data in response to call data and part data prompts in accordance with steps 1002 and 1004, respectively, VRU 234 informs the technician of any errors, for example, by speaking appropriate warnings to the technician (step 1006). At that point, the technician is given the opportunity to review and/or edit either the open call data and/or the open parts data, as necessary (step 1007).

More particularly, the technician may correct call data interactively in response to appropriate prompts from VRU 234 (step 1014) until the call data is properly validated. Similarly, the technician may review and edit parts data until the parts data is properly validated (step 1010).

When all the data is properly validated, the technician enters a predetermined code (e.g., by pressing zero (0) in the illustrated embodiment) indicating to VRU 234 that call and part data has been properly validated. The technician is then prompted to record a "last call" message (step 1015) which, as discussed above, in conjunction with step 526 (FIG. 5), may then be replayed by the next technician servicing the same machine in a subsequent service call.

More particularly, VRU 234 prompts the technician to enter a message regarding the nature of the service call, including any comments or advice which the technician believes may be helpful or instructive in responding to a subsequent service call for the same machine. Specifically, an appropriate prompt is retrieved from MESS 620 in hard drive 109 via disc and tape controller 108, and loaded into voice message file 226 in memory 106. The prompt is then retrieved from voice message file 226, applied to voice board 122 via bus 104 and spoken to the technician. In response, the technician begins speaking his message into his telephone hand-set.

The technician's voice message is digitized by voice board 122 and stored in VOX 604 on hard drive 109. As discussed above, the technician's "last call" voice message is indexed in MESS 620 by the model number and serial number (fields 24 and 25 of Table 1). In this way, the last call message may be conveniently retrieved in the context of a subsequent service call even though the equipment number of the machine may have changed.

After the technician has recorded his "last call" service history, VRU 234 closes the call within ADS 100 (step 1016). More particularly, VRU 234 updates the call status field (field number 1) in the open call record 203. In addition, VRU 234 initiates a sequence of steps to update various other fields within memory 106 (as well as host computer 126), as discussed below.

In particular and with momentary reference to FIG. 4, VRU 234 places the message "MQ_BEGIN_CLOSE" 222 (c) into message queue 222 (step 1018). This initiates the process of updating various files within memory 106 relating to the closure of a call. Upon placing message 222(c) in message queue 222, VRU 234 returns the technician to the technician menu 504, whereupon the technician can execute any of the available options from technician menu 504, as discussed above in conjunction with FIG. 5. VRU 234 has now completed its role in the closure of the call.

In response to message 222(c) being placed in message queue 222, Close D (close call deamon) 238 performs the data transfer functions within ADS 100. Indeed, in the context of the illustrated embodiment, the sole purpose of close call deamon 238 is to effect final (call closure) data transfer functions.

Referring now to FIG. 10B, close call deamon 238 detects message 222(c) in message queue 222 (step 1019) and implements the final closure function set forth in FIG. 10B.

In particular, close call deamon 238 transfers the open call data from the current record 203 within open call buffer 202 to a corresponding record in closed call buffer 214. Close call deamon 238 similarly transfers the open parts data from open parts buffer 204 to a corresponding closed parts record within closed parts buffer 216 (step 1020). Thereafter, the now obsolete records within open call buffer 202 and open parts buffer 204 may be deleted as necessary to accommodate the dynamic operation of ISAM 258 which, as discussed above, supervises the dynamic structure of the various buffers comprising memory 106.

In accordance with a further aspect of the present invention, after step 1020 is completed, close call deamon 238 places message "MQ_NOTIFY_OMD" 222(d) (see FIG. 4) into message queue 222 (step 1021). Upon detecting the presence of message 222(d) in message queue 222 (step 1021(a)), host interface 240 establishes a communication link, at serial port 124, between ADS 100 and host computer 126 and updates host computer 126 (step 1022), thereby closing the call in host computer 126. Specifically, host interface 240 simulates manually entered keystrokes and applies the simulated keystrokes to host computer 126 to simulate a manual call closure, analogous to the manner in which host interface 240 updates the call status within host computer 126, for example as discussed above in conjunction with step 527 (FIG. 5A).

Upon completion of step 1022, namely, upon the updating of host computer 126 to reflect the closed call, host interface 240 places message "MQ_FINISH_CLOSE" 222(e) (FIG. 4) onto message queue 222 (step 1023). Upon detecting the finish close message 222(e) in message queue 222 (1024), close call deamon 238 archives the closed call and closed parts records by transferring them to call history buffer 218 and parts history buffer 220, respectively (step 1026). More particularly, close call deamon 238 also moves information from closed call buffer 214 into call history buffer 218, and moves the corresponding data from the closed parts buffer within 216 into history buffer 220 (step 1026).

Upon moving the call and part data into the call and part history buffers, the processing of the call is completed (step 1028). CPU 102 subsequently transfers the data from parts call history buffer 218 and parts history buffer 220, via disc and tape controller 108, into DATA 606 for permanent archival storage. The various tasking programs discussed above in the context of call processing, including VRU 234, host interface 240 and Close D 238 remain idle until called upon in the manner described above.

Although the foregoing call processing chronology was described in the context of a single call, it is understood that the functions implemented by the hardware and software discussed herein are conveniently adapted to simultaneously process a plurality of service calls in accordance with, inter alia, SCO Unix Program 232.

Returning briefly to FIG. 10B, in an alternate embodiment of the present invention, upon the closing of a call, the data in open call buffer 202 and open parts buffer 204 may be conveniently transferred directly into call history buffer 218 and parts history buffer 220, respectively. That is, the intervening step of transferring the data from open call buffer 202 and open parts buffer 204 into closed call buffer 214 and closed parts buffer 216 (step 1020) may be eliminated, whereby the call and part data is transferred directly from open call buffer 202 and open parts buffer 204 into call history buffer 218 and parts history buffer 220, respectively.

In accordance with a further aspect of the present invention, those skilled in the art will appreciate that certain equipment, for example, office equipment (e.g., photocopy machines) may be provided to a customer under a lease agreement or other arrangement where by the customer is charged on a per diem basis, for example number of photocopies per month (or other suitable time period), number of printed pages per month (in the context of a printer), or the like. In such instances, a mechanism must be implemented for reporting the per diem quantity, e.g., the number of copies per month used by the customer, to the dealer so that the dealer may properly invoice the customer. This situation often arises in a "charge per copy" arrangement in which a customer pays a flat fee per cycle (e.g., month) for up to a given number of copies. For example, a customer may pay a predetermined flat fee to a dealer for up to 30,000 copies per month, and incur an additional per copy charge for each copy in excess of the 30,000 quantity threshold.

In order to properly monitor such a per diem or charge per copy arrangement, it is necessary for the dealer to obtain the number of copies used by each customer during each cycle on a timely basis. However, this often proves to be a difficult and cumbersome task. In prior art systems, a dealer typically telephones a designated individual at a customer site and asks the customer to inform the dealer of the number of copies made by a particular copying machine during the preceding month, for example by visually inspecting a meter attached to the copy machine which increments each time a copy is made. Often, however, one of the two parties is unavailable, such that delays of several days are often encountered in the dealer's attempts to obtain a timely meter reading.

In accordance with one aspect of the present invention, the meter reading function may be partially or wholly automated by the VRU features of ADS 100.

More particularly and with reference to FIGS. 1, 2A, 3A and 8, information pertaining to each machine for which per diem information is desired is suitably contained in an appropriate file within host computer 126 and, if desired, within hard drive 109 (e.g., DATA 606). From time to time, for example on a daily basis, off-line interface 241 may be configured to conduct a search of the database maintained by host computer 126, or alternatively, of DATA 606 to determine those machines for which per diem data (e.g., meter reading) is due on a particular day (step 802).

The records pertaining to each machine for which per diem information is due are then stored in per diem buffer 262 in memory 106 (step 804). A facsimile reminder may then be assembled and transmitted to each customer, via fax board 120, reminding the customer that the per diem information (meter reading) is now due (step 806).

More particularly, off-line interface 241 retrieves the various records within per diem buffer 262, for example on a record by record basis, and loads the appropriate data into FAX.PENDING 614 via disc and tape controller 108, along with an appropriate facsimile image template suitably retrieved from BPLATE 610. The various facsimiles may then be sequentially transmitted, via fax board 120, to the respective customers.

Upon receiving a facsimile reminder that a meter reading is due, the customer may then report the meter reading back to ADS 100 (step 808). More particularly, BPLATE 610 may be configured to generate a facsimile reminder which particularly sets forth the instructions, in terms of telephone keypad strokes, necessary for the customer to conveniently report his meter reading. For example, the facsimile reminder may instruct the customer to dial a predetermined telephone number to thereby access the VRU feature of ADS 100 (step 306, FIG. 3), and further instruct the customer to access main menu processing step 358 as discussed above in conjunction with FIG. 3A. The facsimile instructions may further instruct the customer to enter a predetermined DTMF sequence, to thereby access the automatic meter reading function (step 359 FIG. 3A), and enter the appropriate information via the customer's telephone keypad in response to spoken prompts from the VRU.

In this regard, it is possible that the customer will be required to enter non-numeric data in the course of completing an automatic meter reading function, for example when entering an equipment I.D. number (which often contains non-numeric characters). As discussed above, in conjunction with FIGS. 10 and 12, non-numeric data may be conveniently entered into ADS 100 and indeed, technicians are required to do so routinely. However, customers may not readily appreciate the matter in which non-numeric characters are "converted" as set forth in FIG. 12 for purposes of entering non-numeric data into ADS 100.

Accordingly, the facsimile reminder sheet supplied to the customer may conveniently set forth the converted data, so that the customer need only key in the digit pair set forth on the facsimile reminder sheet, thereby implementing the non-numeric to numeric character conversion functions without having to undertake the conversion process. Stated another way, ADS 100 may perform the conversion algorithm, and simply instruct the customer to enter a predetermined sequence of digits via the customer's telephone keypad and thereby transmit non-numeric data to ADS 100.

Once the meter reading data is received by ADS 100, it may be transmitted to host computer 126, for example off-line interface 241, on-line interface 243, or any other convenient application program to thereby facilitate the invoicing and billing functions typically carried out by host computer 126.

Although the inventions set forth herein have been described in conjunction with the attended drawing figures, those skilled in the art will appreciate that the scope of the invention is not so limited. For example, although the preferred embodiment of the invention surrounds the servicing of photocopy machines, it will be appreciated that the techniques, processes, hardware and software described herein may be utilized in the context of virtually any operation wherein requests for the performance of tasks are received and processed substantially independently of the mechanism by which such requests are ultimately serviced. Indeed, the inventions described herein may be employed in virtually any context in which remote access to a central computer is desired, or when it is advantageous to access a digital computer via a DTMF or other transmission device. Hence, various modifications in the selection and arrangement of the various components and method steps discussed herein may be made without departing from the spirit of the invention as set forth in the appended claims.

We claim:

1. A method for coordinating a request by a first customer for field service repair of a first photocopy machine, the opening of a service request record at a central service facility, the dispatch of a field technician to the customer site, and the reporting of the completion of the service call by the field technician, comprising the steps of:

calling, by a first customer in possession of said first photocopy machine in need of repair, to a switchboard at said central repair facility;

routing said first customer call to a human dispatcher;

eliciting, by said dispatcher, information from said first customer pertaining to said first photocopy machine, including the nature of the machine malfunction;

establishing, by said dispatcher, electronic communication between a first telephone used by said dispatcher, said first telephone having a DTMF keypad associated therewith, and an automated dispatch system (ADS) computer;

entering, by said dispatcher, via said DTMF keypad associated with said first telephone, indicia of said information solicited by said dispatcher from said first customer into said ADS computer to thereby create a first electronic service call record relating to said first customer and to said first machine;

appending to said first service call record in said ADS computer, by said dispatcher, a voice mail message associated with said first machine using said first telephone;

establishing electronic communication between said ADS computer and a host computer maintained at said central service facility, said host computer comprising a first database including information pertaining to a plurality of machines, including said first machine;

updating said first service call record in said ADS computer by said host computer using information contained in said first database;

assigning, by said dispatcher, a priority level to said first service call record;

assigning, by said dispatcher, the service call associated with said first service call record to a first technician by appending indicia of said first technician to said first service call record in said ADS computer;

dialing, by said first technician, a pre-determined telephone number using a second, conventional telephone having a DTMF keypad, to thereby establish a first communication link between said second telephone and said ADS computer;

retrieving, from a second database associated with said ADS computer, said dispatcher voice mail message, and playing said dispatcher voice mail message by said ADS computer such that it is audible to said technician when using said second telephone;

retrieving, from said second database, a prior history voice mail message associated with said first machine, and playing said prior history voice mail message such that it is audible by said technician when using said second telephone;

entering, by said technician, pre-determined command signals onto said DTMF keypad associated with said second telephone to thereby confirm to said ADS computer that said technician has i) received the service call request associated with said first service call record and ii) undertaken the service call;

servicing said first machine at said first customer's premises by said first technician;

dialing said pre-determined telephone number from a third conventional telephone having a DTMF keypad associated therewith, by said first technician, to thereby establish electronic communication between said third telephone and said ADS computer;

prompting said first technician, by said ADS computer, to enter information pertaining to said service call onto said keypad associated with said third telephone in accordance with the following relationships:

each numeric and each alpha character entered onto said third telephone keypad by said first technician corresponds to a two-digit combination of the numbers 0–9; and digit pairs corresponding to non-numeric characters are preceded by at least one of the "*" and "#" keys to indicate to said ADS computer the transmission of a digit pair corresponding to a non-numeric character;

entering into said third telephone keypad for transmission to said ADS computer, by said first technician, a service call completion voice mail message relating to said service call;

storing, in said ADS computer and indexed by indicia of said first machine, said service call completion voice mail message;

establishing electronic communication between said ADS computer and said host computer and thereafter updating said first service call record in said host computer in accordance with the information previously entered by said first technician onto said keypad associated with said third telephone.

2. The method of claim 1, wherein at least one of said second telephone and said third telephone comprises a cellular telephone.

3. The method of claim 1, further comprising the step of assigning a plurality of service call requests to a plurality of technicians.

4. The method of claim 3, further comprising the step of accessing said ADS computer, by said dispatcher, to reassign the priorities of said plurality of service call requests for at least one of said plurality of technicians.

5. The method of claim 1, wherein said step of entering information onto said DTMF keypad associated with said third telephone comprises the step of entering information corresponding to indicia of a first part installed in said first machine by said first technician in conjunction with said service call.

6. The method of claim 1, wherein said step of updating said first service call record in said ADS computer by said host computer comprises the step of updating a first field in said first service call record in said ADS computer with indicia of a serial number associated with said first machine.

7. The method of claim 1, wherein said step of establishing communication between said second telephone and said ADS computer comprises establishing a facsimile transmission link.

8. The method of claim 7, further comprising the step of connecting a facsimile machine by said first technician to the telephone extension associated with said second telephone and transmitting via facsimile transmission, from said ADS computer to said facsimile machine, information pertaining to said first service call record.

9. The method of claim 1, wherein the said step of entering information onto said keypad associated with said third telephone by said technician comprises the step of entering digit pairs in accordance with the following relationship:

| Alpha Character | Digit Code | Alpha Character | Digit Code | Alpha Character | Offset |
| --- | --- | --- | --- | --- | --- |
| A | 01 | ] | 29 | { | 57 |
| B | 02 | ^ | 30 | \| | 58 |
| C | 03 | a | 31 | } | 59 |
| D | 04 | b | 32 | ~ | 60 |
| E | 05 | c | 33 | ! | 61 |
| F | 06 | d | 34 | " | 62 |
| G | 07 | e | 35 | # | 63 |
| H | 08 | f | 36 | $ | 64 |
| I | 09 | g | 37 | % | 65 |
| J | 10 | h | 38 | & | 66 |
| K | 11 | i | 39 | ' | 67 |
| L | 12 | j | 40 | ( | 68 |

-continued

| Alpha Character | Digit Code | Alpha Character | Digit Code | Alpha Character | Offset |
|---|---|---|---|---|---|
| M | 13 | k | 41 | ) | 69 |
| N | 14 | l | 42 | * | 70 |
| O | 15 | m | 43 | + | 71 |
| P | 16 | n | 44 | , | 72 |
| Q | 17 | o | 45 | — | 73 |
| R | 18 | p | 46 | . | 74 |
| S | 19 | q | 47 | / | 75 |
| T | 20 | r | 48 | : | 76 |
| U | 21 | s | 49 | ; | 77 |
| V | 22 | t | 50 | < | 78 |
| W | 23 | u | 51 | = | 79 |
| X | 24 | v | 52 | > | 80 |
| Y | 25 | w | 53 | ? | 81 |
| Z | 26 | x | 54 | @ | 82 |
| [ | 27 | y | 55 |   | 83 |
| \ | 28 | z | 56 | ' | 84 |

10. The method of claim 1, wherein said first telephone and said second telephone are the same telephone.

11. The method of claim 1, wherein said first telephone and said third telephone are the same telephone.

\* \* \* \* \*